US009505642B2

(12) United States Patent
Haase et al.

(10) Patent No.: US 9,505,642 B2
(45) Date of Patent: Nov. 29, 2016

(54) WATER TREATMENT DEVICES

(71) Applicants: Peter Heller Haase, Santa Cruz, CA (US); Ross Harlen Levy, Berkeley, CA (US)

(72) Inventors: Peter Heller Haase, Santa Cruz, CA (US); Ross Harlen Levy, Berkeley, CA (US)

(73) Assignee: Acqualogic, Santa Cruz, CA (US)

( * ) Notice: Subject to any disclaimer, the term of this patent is extended or adjusted under 35 U.S.C. 154(b) by 0 days.

(21) Appl. No.: 14/549,079

(22) Filed: Nov. 20, 2014

(65) Prior Publication Data
US 2015/0218024 A1 Aug. 6, 2015

Related U.S. Application Data

(60) Provisional application No. 61/907,731, filed on Nov. 22, 2013, provisional application No. 61/907,872, filed on Nov. 22, 2013, provisional application No. 61/907,916, filed on Nov. 22, 2013, provisional application No. 61/907,937, filed on Nov. 22, 2013.

(51) Int. Cl.
*C02F 3/28* (2006.01)
*C02F 3/10* (2006.01)
*E04B 1/343* (2006.01)
*B65D 88/16* (2006.01)
*C02F 9/00* (2006.01)
*C02F 3/04* (2006.01)
(Continued)

(52) U.S. Cl.
CPC ............ *C02F 3/2846* (2013.01); *B01D 23/02* (2013.01); *B65D 88/16* (2013.01); *C02F 3/10* (2013.01); *C02F 9/00* (2013.01); *E04B 1/343* (2013.01); *E04B 1/34305* (2013.01); *B65D 88/00* (2013.01); *B65D 88/1612* (2013.01); *C02F 3/04* (2013.01); *C02F 3/105* (2013.01); *C02F 3/109* (2013.01); *C02F 3/284* (2013.01); *C02F 3/286* (2013.01); *C02F 2203/006* (2013.01); *C02F 2203/008* (2013.01); *C02F 2303/14* (2013.01); *E04H 15/28* (2013.01); *Y02E 50/343* (2013.01); *Y02W 10/15* (2015.05); *Y10T 29/49616* (2015.01)

(58) Field of Classification Search
CPC ............ C02F 3/04; C02F 3/10; C02F 3/101; C02F 3/103; C02F 3/105; C02F 3/109; C02F 3/284; C02F 3/286; C02F 3/2846; C02F 2103/007; C02F 2103/06; C02F 2203/006; C02F 2203/008; C02F 9/00; C02F 2303/14; B65D 88/00; B65D 88/16; B65D 88/1612; E04B 1/343; E04B 1/34305; Y10T 29/49616; B01D 23/02; E04H 15/28; Y02E 50/343; Y02W 10/15
See application file for complete search history.

(56) References Cited

U.S. PATENT DOCUMENTS 2,855,966 A 10/1958 Lewis
2,887,243 A * 5/1959 Murdock .................. F17B 1/00
220/8

(Continued)

*Primary Examiner* — Katherine Zalasky
*Assistant Examiner* — Benjamin Lebron
(74) *Attorney, Agent, or Firm* — Wouter Roorda; Jonathan Feuchtwang

(57) ABSTRACT

Embodiments of the invention include water treatment systems and components for water treatment systems that possess a collapsed and an expanded configuration, that can be easily transported in the collapsed configuration and expeditiously set up in the field into their expanded configuration. The embodiments include trickle filter/clarifier combinations, upflow anaerobic digester reactors, recirculating anaerobic digesters and their components. In preferred embodiments the volume of the expanded configurations is at least four times the volume of the collapsed configurations.

7 Claims, 27 Drawing Sheets

(51) Int. Cl.
  *B01D 29/00* (2006.01)
  *E04H 15/28* (2006.01)
  *B65D 88/00* (2006.01)

(56) References Cited

U.S. PATENT DOCUMENTS

| | | | |
|---|---|---|---|
| 3,623,976 A * | 11/1971 | Cessna | C02F 3/04 |
| | | | 210/151 |
| 3,626,958 A * | 12/1971 | Ross | E04H 15/28 |
| | | | 135/147 |
| 4,169,048 A | 9/1979 | Albers | |
| 4,579,654 A | 4/1986 | Bremmer | |
| 4,893,619 A * | 1/1990 | Dale | A61B 17/15 |
| | | | 606/82 |
| 5,306,422 A * | 4/1994 | Krofta | B01D 21/0045 |
| | | | 210/151 |
| 5,333,825 A * | 8/1994 | Christensen | A47C 3/38 |
| | | | 108/144.11 |
| 5,599,450 A | 2/1997 | Li | |
| 6,592,755 B1 | 7/2003 | Nurse | |
| 6,884,342 B2 | 4/2005 | Haley | |
| 6,955,275 B2 | 10/2005 | Haley | |
| 7,169,296 B2 | 1/2007 | Humphrey | |
| 7,186,339 B1 | 3/2007 | Roos | |
| 7,520,990 B2 | 4/2009 | Ruocco | |
| 7,531,087 B2 | 5/2009 | Brase | |
| 8,114,277 B2 | 2/2012 | Jowett | |
| 2003/0221540 A1* | 12/2003 | Takegawa | G10D 13/026 |
| | | | 84/421 |
| 2006/0249440 A1 | 11/2006 | Kaminski | |
| 2009/0277900 A1* | 11/2009 | Howison | B65D 90/0033 |
| | | | 220/1.6 |
| 2010/0065509 A1 | 3/2010 | Kerr | |

\* cited by examiner

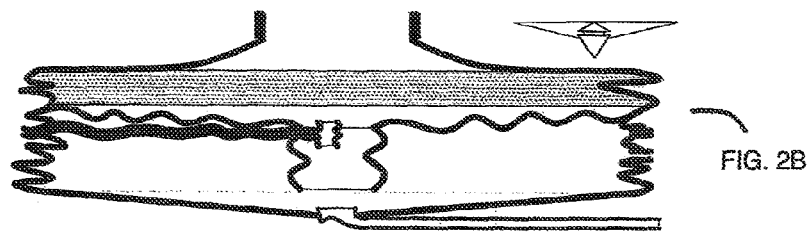
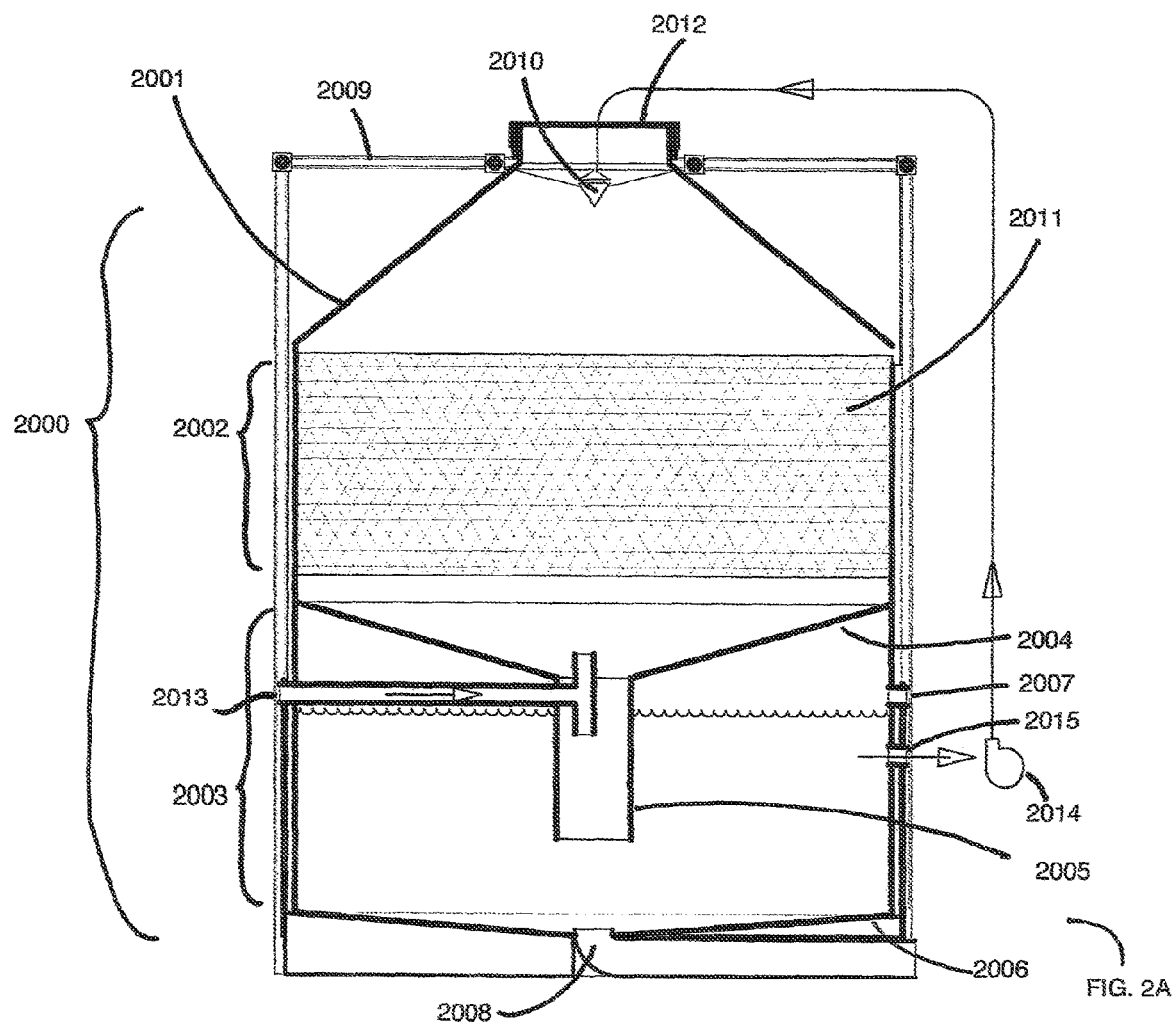

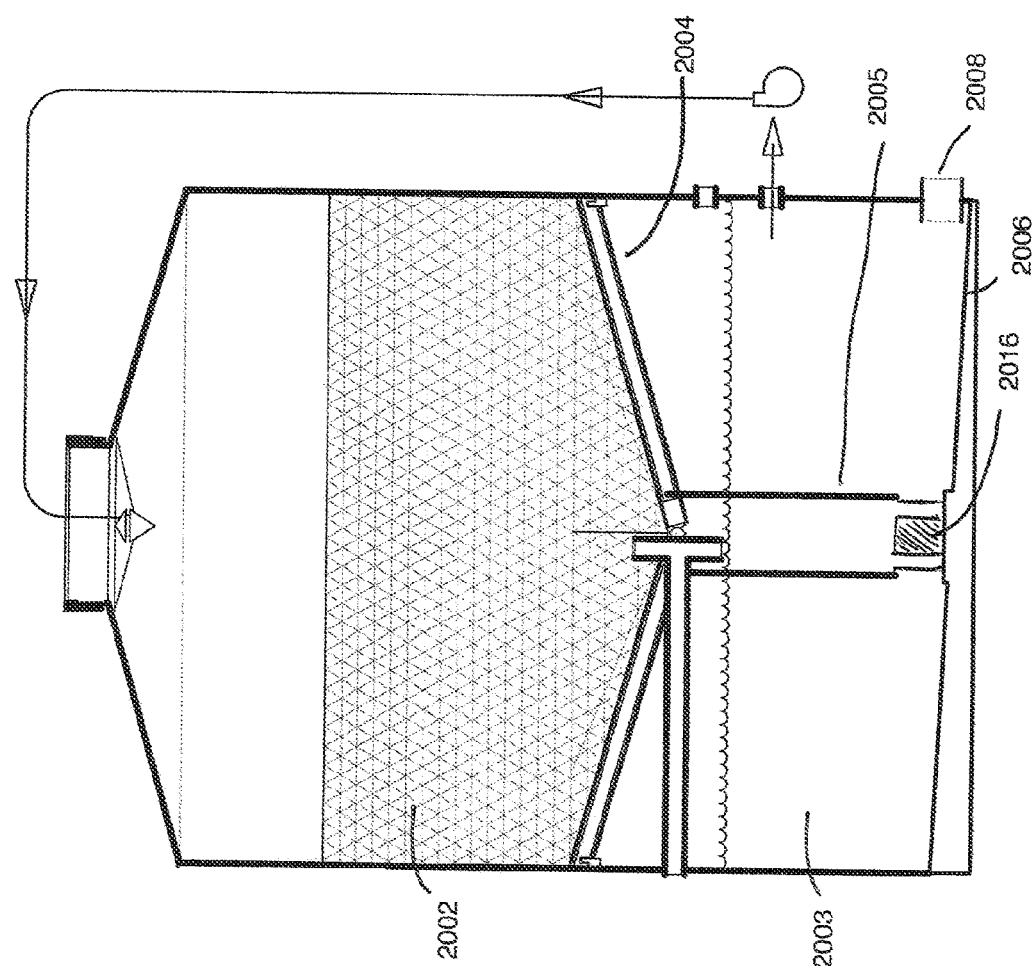

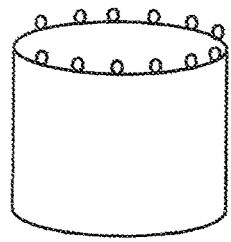 
FIG. 3A
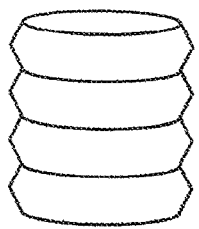 
FIG. 3B
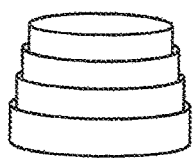 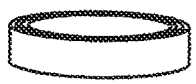
FIG. 3C
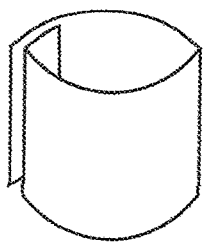 
FIG. 3D

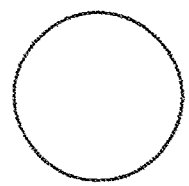
FIG. 4A
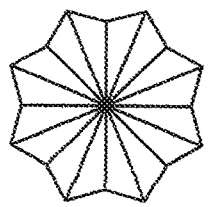
FIG. 4B
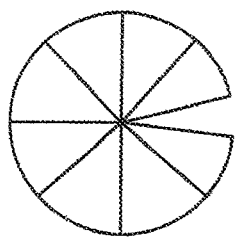
FIG. 4C
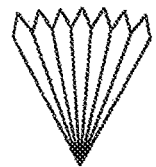
FIG. 4D
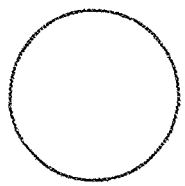
FIG. 4E

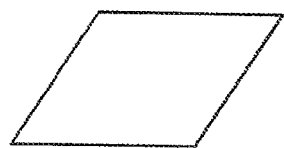  FIG. 5A
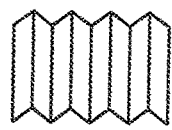  FIG. 5B
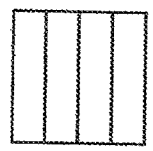  FIG. 5C
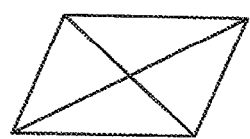  FIG. 5D

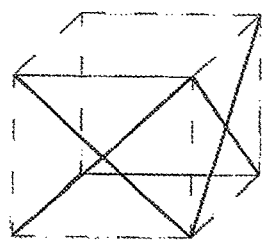 
FIG. 6A
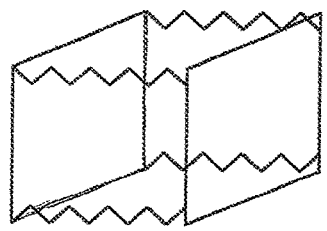 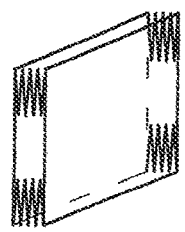
FIG. 6B
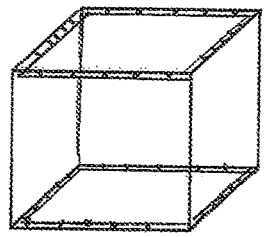 
FIG. 6C
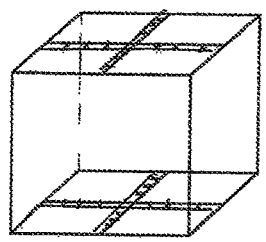 
FIG. 6D

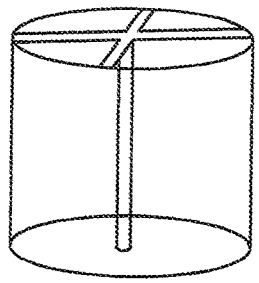 
FIG. 7A
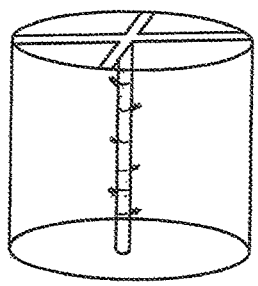 
FIG. 7B
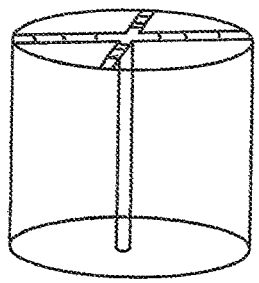 
FIG. 7C
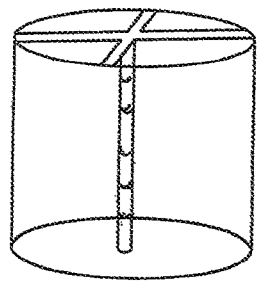 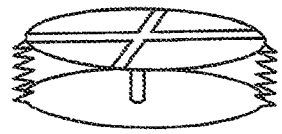
FIG. 7D

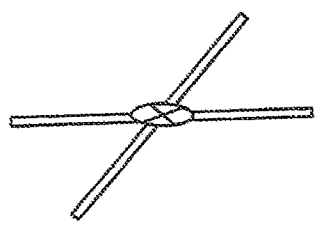 
FIG. 8A
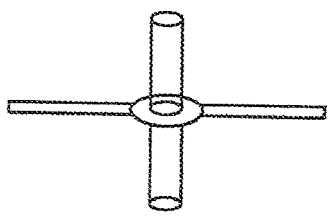 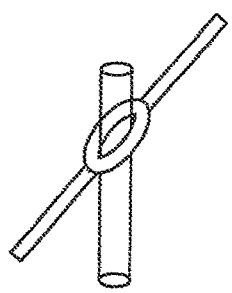
FIG. 8B

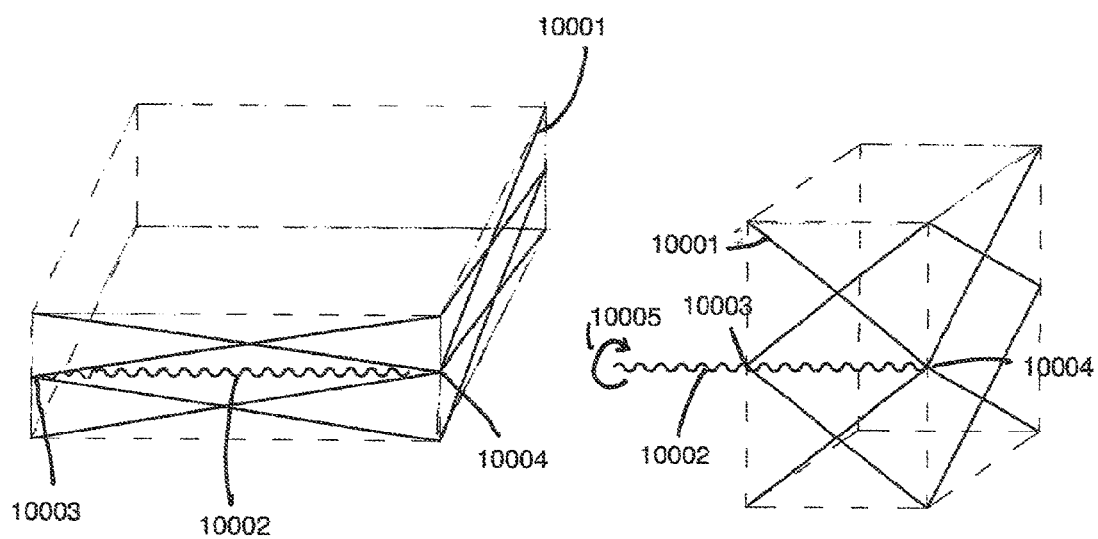

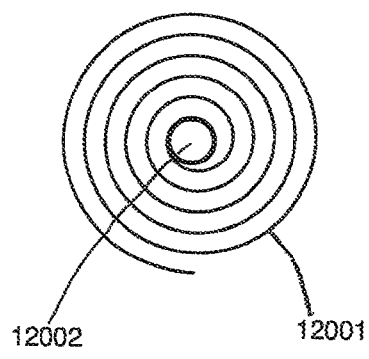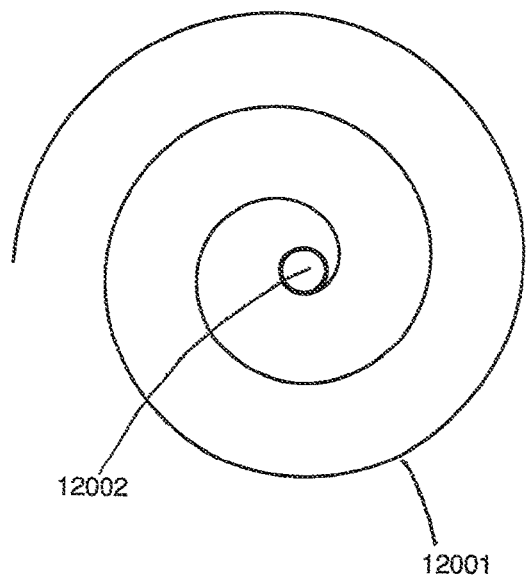
FIG. 12A
FIG. 12B

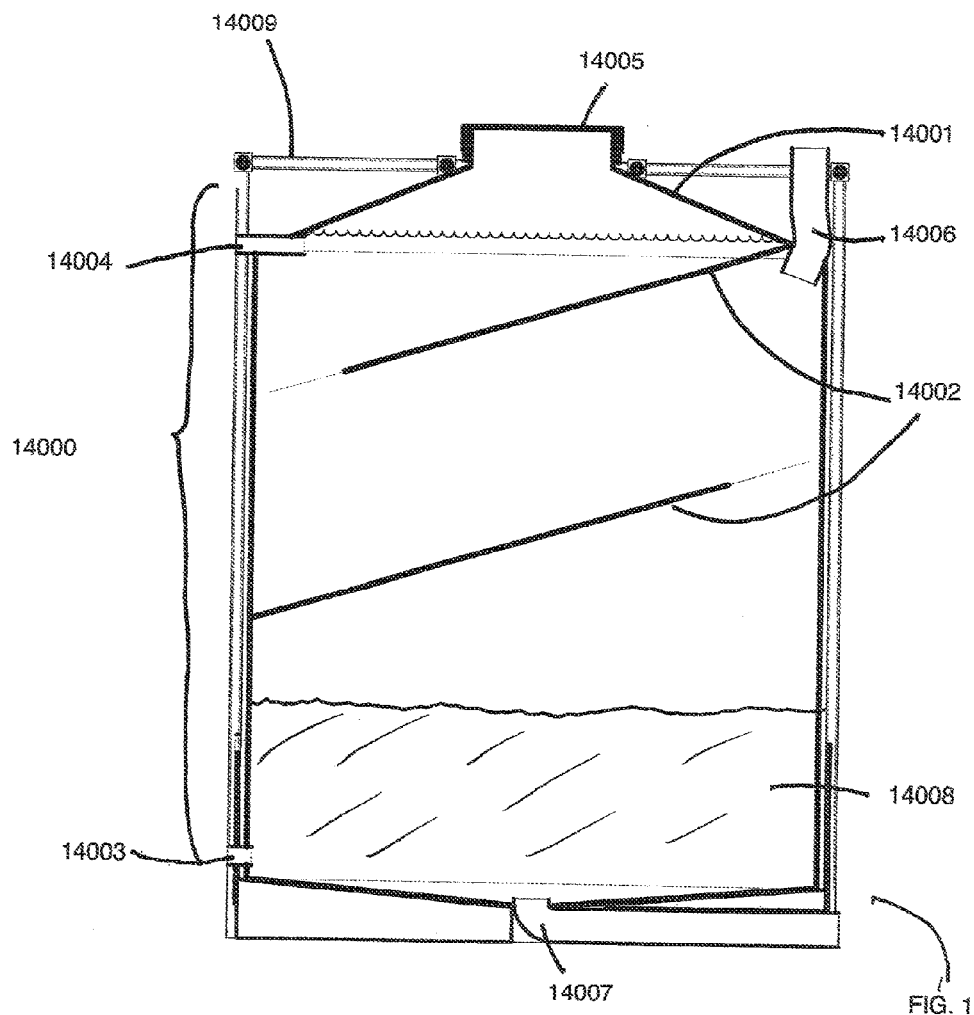

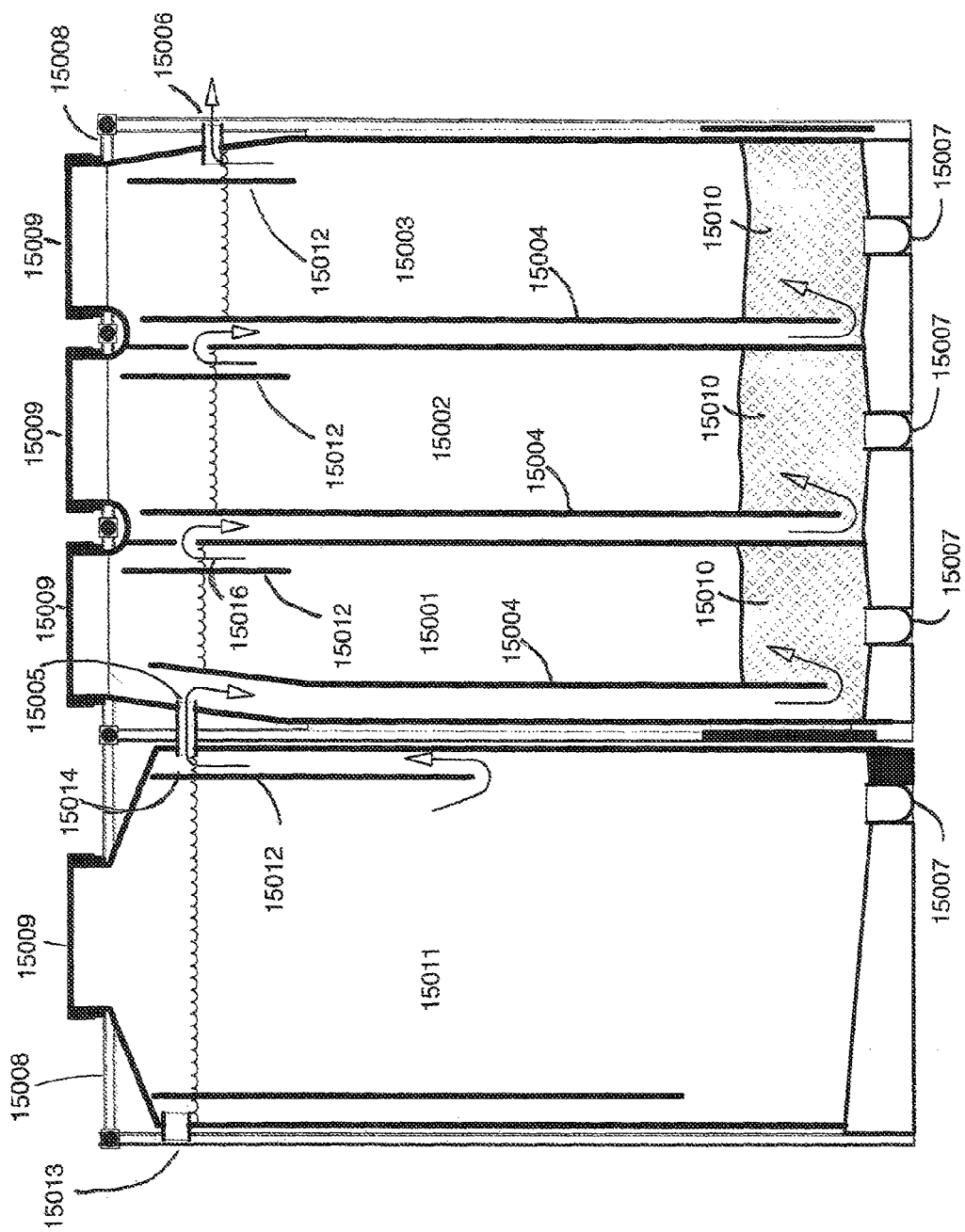

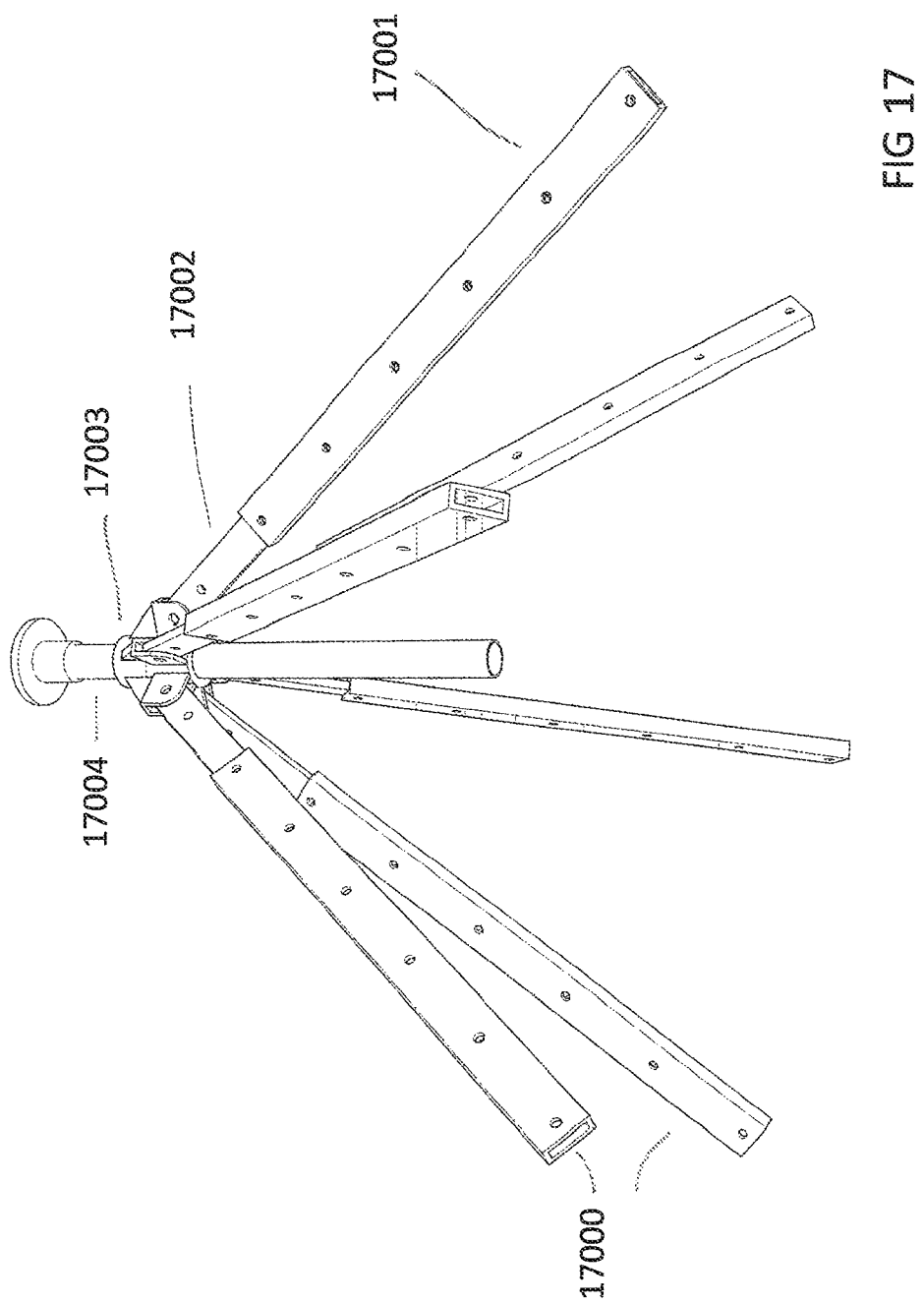

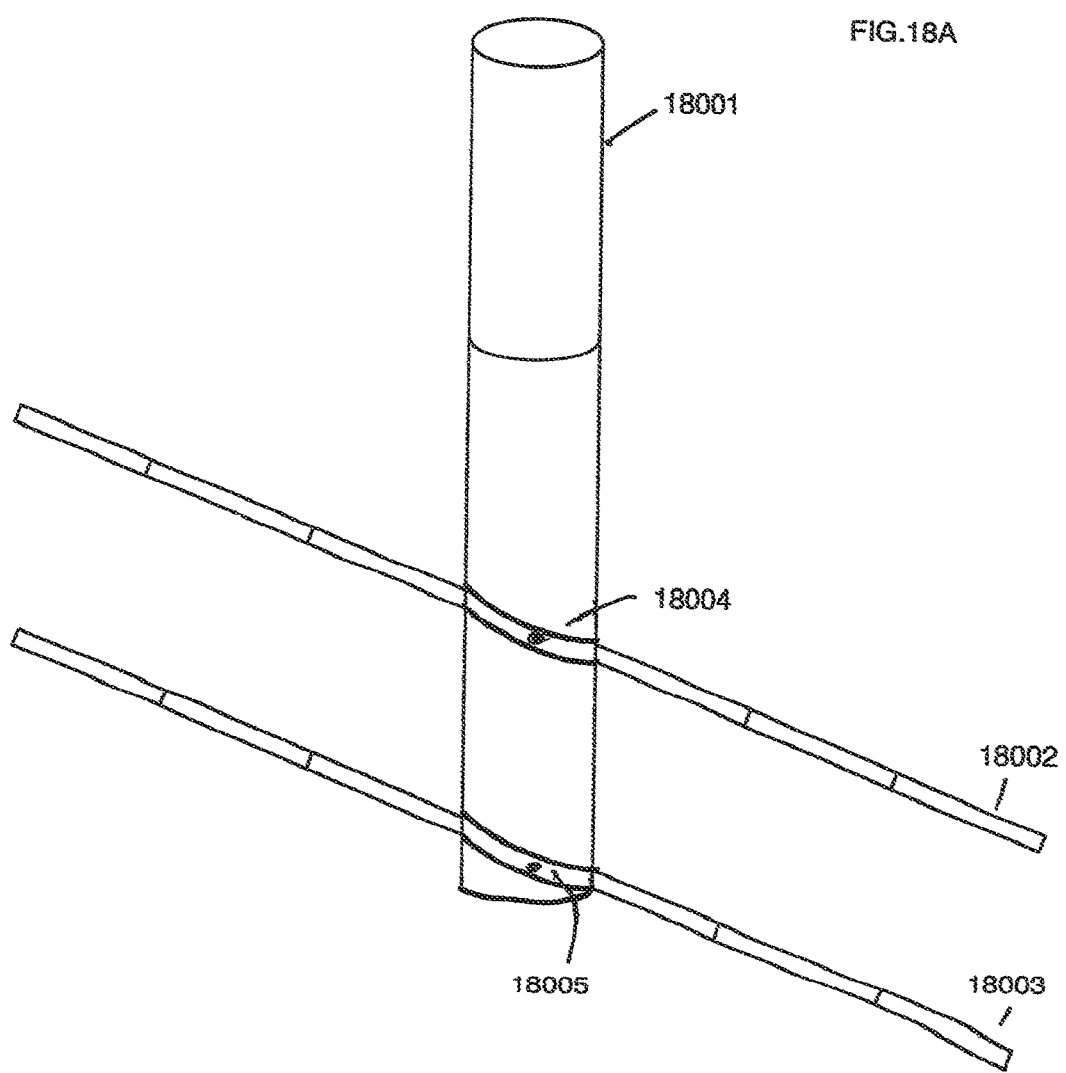

WATER TREATMENT DEVICES

RELATED APPLICATIONS

This application claims the priority from Provisional Patent Applications 61/907,731, 61/907,872, 61/907,916, and 61/907,937, all filed on Nov. 22 2013.

BACKGROUND

Water treatment may need to be performed on any type of water that contains undesirable compounds. This includes, but is not limited to water, also referred to as waste water and produced water, that contains contaminants due to its use in a process, such as industrial, agricultural, household and other human use, as well as other types of water that contain undesirable compounds, for instance due to their natural origin or method of collection.

Water treatment plants are at times needed on remote locations and on short notice. Construction from the ground up can be time consuming, and impractical, for instance because of a lack of supplies and skilled labor at the desired location of the plant. For that purpose, pre-fabricated, mobile plants have been developed.

In the prior art, illustrated in FIG. 1 (U.S. Pat. No. 7,531,087, Mar. 12 2009), these plants are constructed on a container-like platform and often shipped in turn-key condition on a flatbed truck or trailer. This configuration inherently comprises a large volume of void space, and makes the shipping mode unwieldy, expensive, impractical for many remote locations and unsuitable for delivery by small vehicles or helicopter. Consequently, there is a need for a new type of field-erectable water treatment plant with improved transportation capabilities.

Additionally, water treatment plants are at times needed on locations that have access to generically available components, like tanks, reservoirs, pipes, pumps etc, but not to the specialized interior components, like inserts useable as compartment separators, sedimentation floors, gas baffles and internal support frames for such components. Generically available tanks and reservoirs may not always match standard sizes for the specialized components. Consequently, there is a need for size adjustable, specialized components for water treatment systems that can be used in a range of sizes of tanks and reservoirs.

SUMMARY

In general, and in accordance with the present invention there is provided easily transportable, field-erectable systems for the treatment of water, as well as components and kits for the assembly of such systems, as well as methods to erect said systems in the field.

Some embodiments of the invention comprise internal components for water treatment systems that are size-adjustable to be compatible with generically available tanks or reservoirs. Such internal components may be adjustable to a range of shapes and sizes of reservoirs used in the construction of the water treatment system. Such size adjustable components may include, for instance, inserts useful as a separator assembly or a floor assembly for a trickle filter-clarifier combination, or as baffles for an upflow anaerobic sludge blanket reactor. Other components may include a size-adjustable internal support frame.

Some embodiments of the invention may comprise reservoirs, or reservoir assemblies comprising reservoirs and components for water treatment systems, wherein the reservoirs or reservoir assemblies comprise a collapsed configuration with a first volume and an expanded configuration with a second volume. In some preferred embodiments the second volume is at least 4 times larger than the first volume. In some preferred embodiments the reservoirs or reservoir assemblies are capable of being expanded from the collapsed configuration into the expanded configuration with a second volume.

The embodiments may have different types of cross sections, including circular, triangular, square or rectangular cross-sections, or custom cross-sections for specific requirements from a location for the device.

In some preferred embodiments, components of the water treatment system are integrated with a reservoir into a single unit in order to facilitate erection of the system in the field, "integrated into a single unit" meaning that the parts have been manufactured as a single piece, or have been durably connected with each other during manufacturing, and are not designed or intended to be separated during set-up or use of the equipment.

Some embodiments of the invention comprise an expandable biological medium carrier. In preferred embodiments the biological medium carrier may be integrated into a single unit with a reservoir or reservoir assembly used to contain the flow of water being treated, to facilitate erection of the system in the field.

Some embodiments of the invention comprise a frame or components for a frame configured to support an expandable reservoir or reservoir assembly. In some embodiments of the invention the frame is an expandable frame. In some embodiments of the invention the expandable reservoir or reservoir assembly is connected with an expandable frame and expanding the frame causes the reservoir or reservoir assembly to be expanded, in order to facilitate erection in the field.

In some embodiments the transition between a collapsed and an expanded configuration may be reversible. In other embodiments the transition from a collapsed to an expanded configuration may be irreversible, for instance when maintaining an expanded configuration requires welding, bolting, riveting, or use of adhesives, or when snap-in-place features like barbs or other locking mechanisms are used.

Suitable materials of construction of the embodiments of the invention include metals, like stainless steel, copper and galvanized iron, and polymeric components like poly-ethylene, polypropylene, nylons, poly-ethylene terephtalate and poly-urethanes. For some embodiments or components of the invention, like flexible reservoirs, composite materials, like fiber-reinforced plastic sheets may be suitable. For some structural components, like external support frames, wood, aluminum, galvanized metal or stainless steel may be a suitable material. Those with ordinary skills in the art of water treatment, water storage or civil engineering will easily be able to select suitable materials for construction of the embodiments of the invention.

Exemplary embodiments of the invention include:

A water treatment system configured as a vertically stacked trickle filter-clarifier combination having a reservoir assembly, the reservoir assembly comprising a reservoir with an upper trickle filter compartment and a lower clarifier compartment, the reservoir having a collapsed configuration with a first volume and an expanded configuration with a second volume, wherein the second volume is at least 4 times larger than the first volume; a separator located between the upper trickle filter compartment and the lower clarifier compartment; and a drain configured as a conduit between the upper trickle filter compartment and the lower clarifier compartment.

A water treatment system as described above, further comprising a floor located below the lower clarifier compartment.

A water treatment system as described above, wherein at least one of the separator, the drain and the floor is integrated with the reservoir into a single unit.

A water treatment system as described above, further comprising a biological medium carrier within the upper trickle filter compartment, wherein the biological medium carrier has a collapsed configuration with a first volume and an expanded configuration with a second volume.

A water treatment system as described above, wherein the biological medium carrier is integrated into a single unit with the upper trickle filter compartment.

A water treatment system configured as a recirculating anaerobic digester having a reservoir assembly, the reservoir assembly comprising a sequence of consecutive upflow anaerobic digester reservoirs with a first reservoir and a last reservoir, the digester reservoirs having a collapsed configuration with a first volume and an expanded configuration with a second volume, wherein the second volume is at least 4 times larger than the first volume; at least one conduit from an upper level in each reservoir, except the last reservoir, to a lower level in a consecutive reservoir; a water inlet connected with the first reservoir; and a water outlet connected with the last reservoir; the reservoirs and the at least one conduit providing a flow path for water from the water inlet to the water outlet.

A water treatment system as described above, wherein at least one digester reservoir and at least one conduit have been integrated into a single unit.

A water treatment system as described above, wherein the at least one conduit is formed by a channel between seams connecting two adjacent reservoirs.

A water treatment system configured as an upflow anaerobic sludge blanket reactor having a reservoir assembly, the reservoir assembly comprising a reservoir having a collapsed configuration with a first volume and an expanded configuration with a second volume, wherein the second volume is at least 4 times larger than the first volume; at least one baffle configured as a guide to a gas outlet for methane gas produced during operation of the water treatment system; a water inlet connected with the reservoir at a lower level; a water outlet connected with the reservoir at an upper level; and a gas outlet connected with the reservoir at an upper level.

A water treatment system as described above, wherein the at least one baffle is integrated with the reservoir into a single unit.

A water treatment system as described above, wherein the reservoir assembly comprises a flexible sheet construction.

A water treatment system as described above, wherein the reservoir assembly comprises an accordion construction.

A water treatment system as described above, wherein the reservoir assembly comprises a telescope construction.

A water treatment system as described above, further comprising a support frame configured to support the reservoir assembly, wherein the support frame has a collapsed configuration and an expanded configuration.

A water treatment system as described above, wherein the support frame comprises an upright central support member; and at least one set of radial support cross members, moveably connected with the central support member in an umbrella configuration.

A water treatment system having a biological medium carrier as described above, further comprising a support frame configured to support the reservoir assembly, the support frame having a collapsed configuration and an expanded configuration and having an upright central support member with at least one set of radial support cross members moveably connected with the central support member in an umbrella configuration; and the biological medium carrier being connected with radial support cross members.

A size-adjustable internal support frame for a water treatment system, comprising a central support member; and at least one set of length-adjustable radial support cross members connected with the central support member in an umbrella configuration; the radial support cross members being hingedly moveable between a collapsed and an expanded configuration.

A size-adjustable insert for a water treatment system, comprising a plurality of length-adjustable radial support cross members connected with a central hub in a radially adjustable configuration; an elastic sheet of material having a surface area, the sheet being connected with the support cross members; the surface area of the sheet being elastically adjustable to match a surface area defined by the radially adjustable configuration of the support cross members.

A size-adjustable insert for a water treatment system, comprising a plurality of length-adjustable radial support cross members, connected with a central hub in a radially adjustable configuration; and a sheet of material having a plurality of sleeves matching the plurality of support cross members; wherein the support cross members are slideably introduced into the sleeves to a depth defining a surface area of the sheet matching a surface area defined by the radially adjustable configuration of the support cross members.

A size-adjustable insert for a water treatment system, comprising a base plate; and a plurality of lamellae, each said lamella being hingedly attached to the base plate by a pivot member; wherein rotating the lamellae in concert around their pivot members defines a size-adjustable surface area of the size-adjustable insert.

A size-adjustable insert for a water treatment system, comprising a base plate; and a plurality of moveable sheets arranged in a tessellated fashion around the base plate; wherein moving the sheets with respect to the base plate defines a size-adjustable surface area of the size-adjustable insert.

The size-adjustable insert as described above, wherein the size-adjustable insert is one of a separator, a floor and a baffle.

A kit comprising components for a water treatment system configured as a vertically stacked trickle filter-clarifier combination, the components comprising a reservoir configured to have an upper trickle filter compartment and a lower clarifier compartment, the reservoir having a collapsed configuration with a first volume and an expanded configuration with a second volume, and wherein the second volume is at least 4 times larger than the first volume; a separator configured to be located between the upper trickle filter compartment and the lower clarifier compartment; and a drain configured as a conduit between the upper trickle filter compartment and the lower clarifier compartment.

A kit as described above, the components further comprising a floor configured to be located below the lower clarifier compartment.

A kit as described above, wherein at least one of the separator, the drain and the floor is integrated with the reservoir into a single unit.

A kit as described above, the components further comprising a biological medium carrier within the upper trickle filter compartment, the biological medium carrier having a collapsed configuration with a first volume and an expanded configuration with a second volume.

A kit as described above, wherein the biological medium carrier is integrated into a single unit with the upper trickle filter compartment.

A kit comprising components for a water treatment system configured as a recirculating anaerobic digester, the components comprising a plurality of upflow anaerobic digester reservoirs configured to form a sequence with a first reservoir and a last reservoir, the digester reservoirs having a collapsed configuration with a first volume and an expanded configuration with a second volume wherein the second volume is at least 4 times larger than the first volume; at least one conduit configured to run from an upper level in a reservoir to a lower level in a consecutive reservoir; a water inlet configured to be connected with the first reservoir; and a water outlet configured to be connected with the last reservoir; the reservoirs and the at least one conduit configured to provide a flow path for water from the water inlet to the water outlet.

A kit as described above, wherein the digester reservoirs and the at least one conduit have been integrated into a single unit.

A kit as described above, wherein the at least one conduit is formed by a channel between seams connecting two adjacent reservoirs.

A kit comprising components for a water treatment system configured as an upflow anaerobic sludge blanket reactor, the components comprising a reservoir having a collapsed configuration with a first volume and an expanded configuration with a second volume, wherein the second volume is at least 4 times larger than the first volume; at least one baffle configured as a guide to a gas outlet for methane gas produced during operation of the water treatment system; a water inlet configured to be connected with the reservoir at a lower level; a water outlet configured to be connected with the reservoir at an upper level; and a gas outlet configured to be connected with the reservoir at an upper level.

A kit as described above wherein the at least one baffle is integrated with the reservoir into a single unit.

A kit as described above, wherein the reservoir assembly comprises a flexible sheet construction.

A kit as described above, wherein the reservoir assembly comprises an accordion construction.

A kit as described above, wherein the reservoir assembly comprises a telescope construction.

A kit as described above, further comprising components for a support frame configured to support the reservoir assembly, the support frame having a collapsed and an expanded configuration.

A kit as described above, wherein the components for the support frame comprise an upright central support member; and at least one set of radial support cross members, configured to be moveably connected with the central support member in an umbrella configuration; wherein the support cross members comprise a collapsed configuration and an expanded configuration.

A kit as described above, further comprising components for a support frame configured to support the reservoir assembly, the support frame having a collapsed and an expanded configuration and having an upright central support member with least one set of radial support cross members moveably connected with the central support member in an umbrella configuration; wherein the biological medium carrier is connected with radial support cross members.

A kit comprising components for a size-adjustable internal support frame for a water treatment system, the components comprising a central support member; and at least one set of length-adjustable radial support cross member configured to be connected with the central support member in an umbrella configuration; the radial support cross members being hingedly moveable between a collapsed and an expanded configuration.

A kit comprising components for a size-adjustable insert for a water treatment system, the components comprising a central hub; a plurality of length-adjustable radial support cross members, configured to be connected with the central hub in a radially adjustable configuration; and an elastic sheet of material having a surface area; the sheet configured to be connected with the support cross members, wherein the surface area of the sheet is elastically adjustable to match a surface area defined by the radially adjustable configuration of the support cross members.

A kit comprising components for a size-adjustable insert for a water treatment system, the components comprising: a plurality of length-adjustable radial support cross members, configured to be connected with a central hub in a radially adjustable configuration; and a sheet of material having a plurality of sleeves matching the plurality of support cross members; wherein the support cross members are configured to slideably engage the sleeves to a depth defining a surface area matching a surface area defined by the radially adjustable configuration of the support cross members.

A kit comprising components for a size-adjustable insert for a water treatment system, the components comprising a base plate; and a plurality of lamellae, each said lamellae hingedly attached to the base plate by a pivot member; wherein rotating the lamellae in concert around their pivot members defines a size-adjustable surface area of the insert.

A kit comprising components for a size-adjustable insert for a water treatment system, the components comprising: a base plate; and a plurality of moveable sheets configured to be arranged in a tessellated fashion around the base plate; wherein moving the sheets with respect to the base plate defines a size-adjustable surface area of the size-adjustable insert.

A method for erecting a water treatment system configured as a vertically stacked trickle filter-clarifier combination, comprising the steps of providing components for a reservoir assembly for the water treatment system; the components comprising a reservoir with an upper trickle filter compartment and a lower clarifier compartment, the reservoir having a collapsed configuration with a first volume and an expanded configuration with a second volume, wherein the second volume is at least 4 times larger than the first volume, the reservoir being provided in the collapsed configuration; and a separator configured to be located between the upper trickle filter compartment and the lower clarifier compartment; and a drain configured as a conduit between the upper trickle filter compartment and the lower clarifier compartment; expanding the reservoir from the collapsed configuration to the expanded configuration; assembling the reservoir assembly; providing components for a support frame; erecting the support frame; and connecting the reservoir assembly with the support frame.

A method for erecting a water treatment system configured as a vertically stacked trickle filter-clarifier combination, comprising the steps of providing a reservoir assembly for the water treatment system in a collapsed configuration;

the reservoir assembly comprising a reservoir with an upper trickle filter compartment and a lower clarifier compartment, the reservoir having a collapsed configuration with a first volume and an expanded configuration with a second volume, wherein the second volume is at least 4 times larger than the first volume; a separator located between the upper trickle filter compartment and the lower clarifier compartment; and a drain configured as a conduit between the upper trickle filter compartment and the lower clarifier compartment; expanding the reservoir assembly from the collapsed configuration to an expanded configuration; providing components for a support frame; erecting the support frame; and connecting the reservoir assembly with the support frame.

A method for erecting a water treatment system configured as a vertically stacked trickle filter-clarifier combination, comprising the steps of providing a reservoir assembly for the water treatment system in a collapsed configuration; the reservoir assembly comprising a reservoir with an upper trickle filter compartment and a lower clarifier compartment, the reservoir having a collapsed configuration with a first volume and an expanded configuration with a second volume, wherein the second volume is at least 4 times larger than the first volume; a separator configured to be located between the upper trickle filter compartment and the lower clarifier compartment; and a drain configured as a conduit between the upper trickle filter compartment and the lower clarifier compartment; providing a support frame in a collapsed configuration and connected with the reservoir assembly; and expanding the support frame; wherein expansion of the support frame causes expansion of the reservoir assembly.

A method for erecting a water treatment system configured as a recirculating anaerobic digester, comprising the steps of providing components for a reservoir assembly for the water treatment system; the components comprising a plurality of upflow anaerobic digester reservoirs configured to form a sequence with a first reservoir and a last reservoir, the digester reservoirs having a collapsed configuration with a first volume and an expanded configuration with a second volume at least 4 times larger than the first volume, the digester reservoirs being provided in a collapsed configuration; at least one conduit configured to run from an upper level in a reservoir to a lower level in a consecutive reservoir; a water inlet configured to be connected with the first reservoir; and a water outlet configured to be connected with the last reservoir; the reservoirs and the at least one conduit configured to provide a flow path for water from the water inlet to the water outlet; expanding the reservoirs from the collapsed configuration to the expanded configuration; assembling the reservoir assembly; providing components for a support frame; erecting the support frame; and connecting the reservoir assembly with the support frame.

A method for erecting a water treatment system configured as a recirculating anaerobic digester, comprising the steps of providing a reservoir assembly for the water treatment system in a collapsed configuration; the reservoir assembly comprising a sequence of consecutive upflow anaerobic digester reservoirs with a first reservoir and a last reservoir, the digester reservoirs having a collapsed configuration with a first volume and an expanded configuration with a second volume, wherein the second volume is at least 4 times larger than the first volume; at least one conduit configured to run from an upper level in a reservoir to a lower level in a consecutive reservoir; a water inlet configured to be connected with the first reservoir; and a water outlet configured to be connected with the last reservoir; the reservoirs and the at least one conduit configured to provide a flow path for water from the water inlet to the water outlet; expanding the reservoir assembly from the collapsed configuration to the expanded configuration; providing components for a support frame; erecting the support frame; and connecting the reservoir assembly with the support frame.

A method for erecting a water treatment system configured as a recirculating anaerobic digester, comprising the steps of providing a reservoir assembly for the water treatment system in a collapsed configuration; the reservoir assembly comprising a sequence of consecutive upflow anaerobic digester reservoirs with a first reservoir and a last reservoir, the digester reservoirs having a collapsed configuration with a first volume and an expanded configuration with a second volume, wherein the second volume is at least 4 times larger than the first volume; at least one conduit configured to run from an upper level in a reservoir to a lower level in a consecutive reservoir; a water inlet configured to be connected with the first reservoir; and a water outlet configured to be connected with the last reservoir; the reservoirs and the at least one conduit configured to provide a flow path for water from the water inlet to the water outlet; providing a support frame in a collapsed configuration and connected with the reservoir assembly; and expanding the support frame; wherein expansion of the support frame causes expansion of the reservoir assembly.

A method for erecting a water treatment system configured as an upflow anaerobic sludge blanket reactor, comprising the steps of providing components for a reservoir assembly for the water treatment system; the components comprising a reservoir having a collapsed configuration with a first volume and an expanded configuration with a second volume, wherein the second volume is at least 4 times larger than the first volume, the reservoirs being provided in the collapsed configuration; at least one baffle configured as a guide to a gas outlet for methane gas produced during operation of the water treatment system; a water inlet configured to be connected with the reservoir at a lower level; a water outlet configured to be connected with the reservoir at an upper level; and a gas outlet configured to be connected with the reservoir at an upper level; expanding the reservoir from the collapsed configuration to the expanded configuration; assembling the reservoir assembly; providing components for a support frame; erecting the support frame; and connecting the reservoir assembly with the support frame.

A method for erecting a water treatment system configured as an upflow anaerobic sludge blanket reactor, comprising the steps of providing a reservoir assembly for the water treatment system in a collapsed configuration; the reservoir assembly comprising a reservoir having a collapsed configuration with a first volume and an expanded configuration with a second volume, wherein the second volume is at least 4 times larger than the first volume, the reservoirs being provided in the collapsed configuration; at least one baffle configured as a guide to a gas outlet for methane gas produced during operation of the water treatment system; a water inlet configured to be connected with the reservoir at a lower level; a water outlet configured to be connected with the reservoir at an upper level; and a gas outlet configured to be connected with the reservoir at an upper level; expanding the reservoir assembly from the collapsed configuration to the expanded configuration; providing components for a support frame; erecting the support frame; and connecting the reservoir assembly with the support frame.

A method for erecting a water treatment system configured as a recirculating anaerobic digester, comprising the steps of: providing a reservoir assembly for the water treatment system in a collapsed configuration; the reservoir assembly comprising a reservoir having a collapsed configuration with a first volume and an expanded configuration with a second volume, wherein the second volume is at least 4 times larger than the first volume, the reservoirs being provided in the collapsed configuration; at least one baffle configured as a guide to a gas outlet for methane gas produced during operation of the water treatment system; a water inlet configured to be connected with the reservoir at a lower level; a water outlet configured to be connected with the reservoir at an upper level; and a gas outlet configured to be connected with the reservoir at an upper level; providing a support frame in a collapsed configuration and connected with the reservoir assembly; and expanding the support frame; wherein expansion of the support frame causes expansion of the reservoir assembly.

LISTING OF DRAWINGS

FIG. 1 illustrates an embodiment of the prior art.

FIG. 2A-B illustrates an embodiment of a biological trickle filter/clarifier combination according to the invention in an expanded configuration and a collapsed configuration.

FIG. 2C illustrates an alternative embodiment of a biological trickle filter/clarifier combination according to the invention in an expanded configuration.

FIG. 3A-D illustrates embodiments of expandable reservoirs according to the invention.

FIG. 4A-E illustrates embodiments of round internal components like separators floors and baffles according to the invention.

FIG. 5A-E illustrates embodiments of square internal components like separators floors and baffles according to the invention FIG. 6A-D illustrates embodiments of expandable perimeter frames according to the invention.

FIG. 7A-D illustrates embodiments of expandable central frames according to the invention.

FIG. 8A illustrates and embodiment of a support cross member assembly having four moveable support cross members connected with a central hub according to the invention.

FIG. 8B illustrates an embodiment of a support cross member assembly having a single pivoting support cross member according to the invention.

Figure 9A:
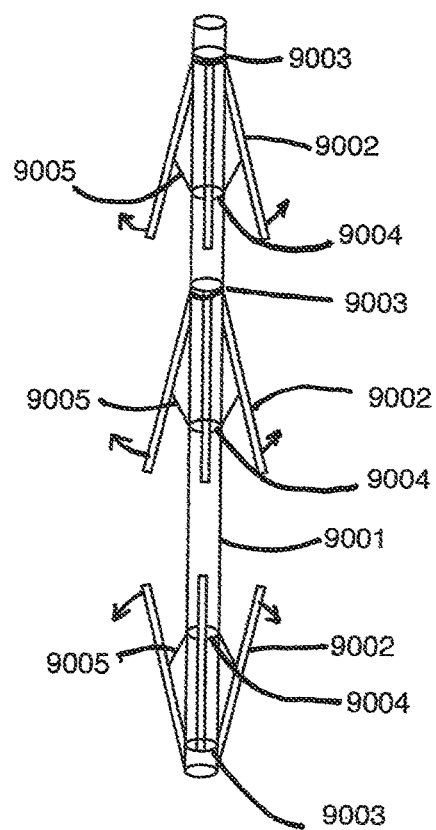
Figure 9B:
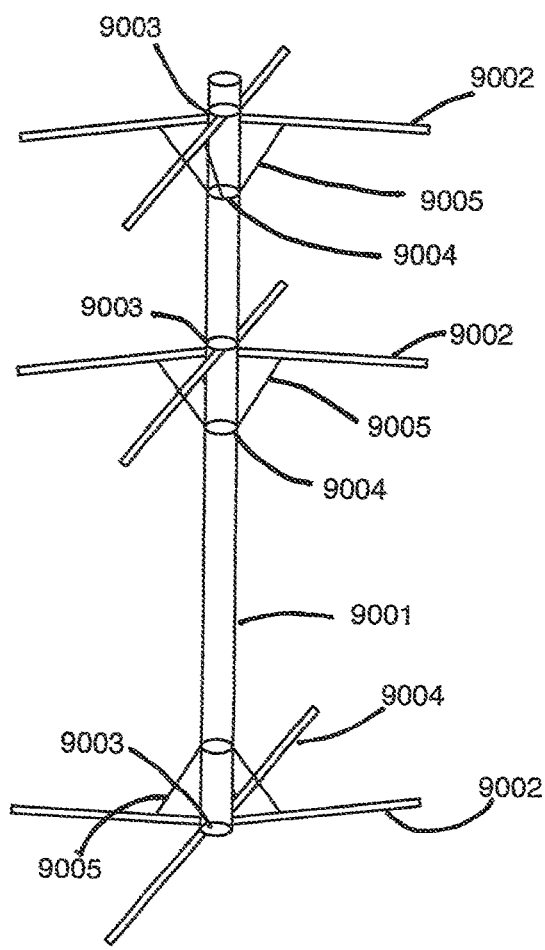

FIG. 9A-B illustrates a central support frame with radial support cross members in umbrella configurations.

FIG. 10A-B illustrate an embodiment of a perimeter frame with a scissor-jack mechanism.

Figure 11:
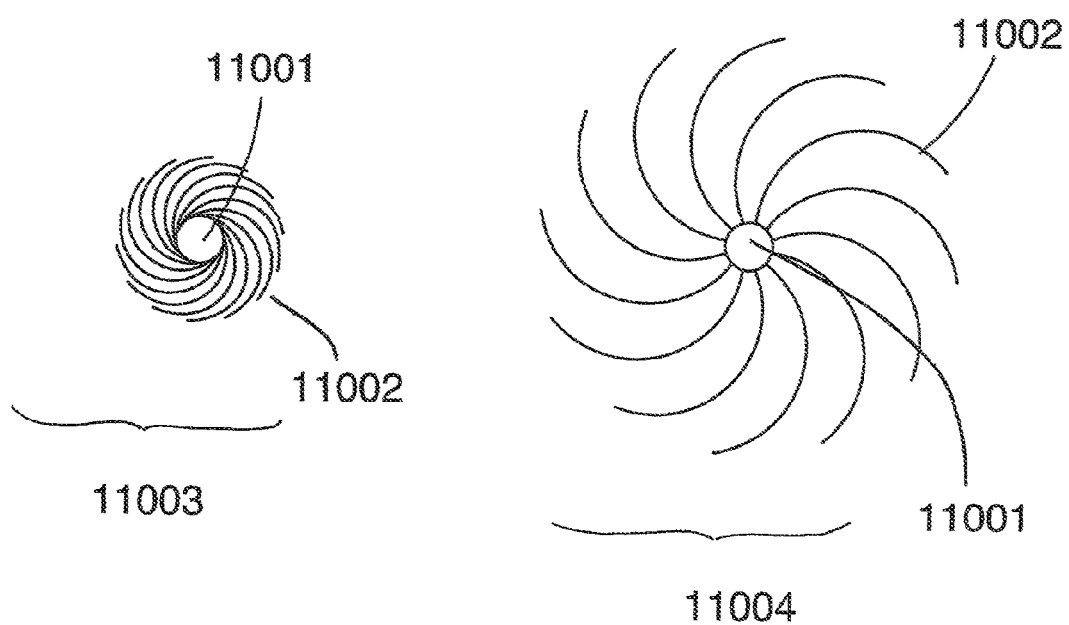

FIG. 11 illustrates a top view of a rolled-up configuration and an expanded configuration of a set of sheet-shaped biological medium carriers.

FIG. 12A-B illustrates a top view of a rolled-up configuration and an expanded configuration of a biological medium carrier in the form of a single sheet and a support frame.

Figure 13:
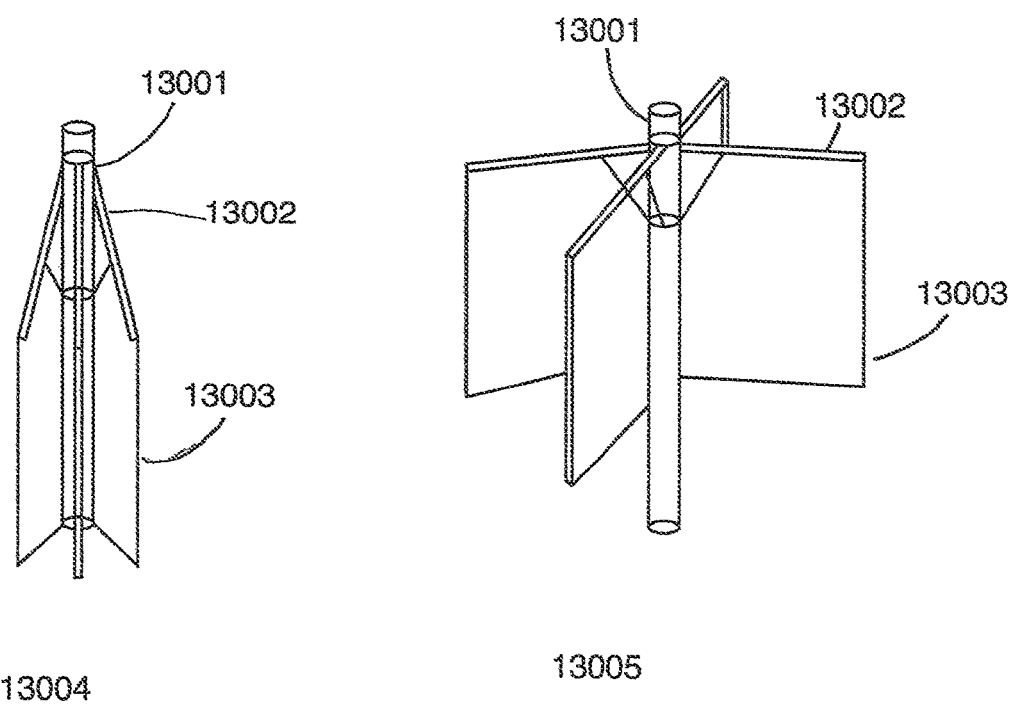

FIG. 13 illustrates an embodiment of an array of biological medium carriers attached to radial cross members in a collapsed and an expanded configuration.

FIG. 14A-B illustrates an embodiment of an upflow anaerobic sludge blanket reactor according to the invention in an expanded configuration and a collapsed configuration.

FIG. 15A-B illustrates an embodiment of a recirculating anaerobic digester according to the invention in an expanded configuration and in a collapsed configuration.

Figure 15C:
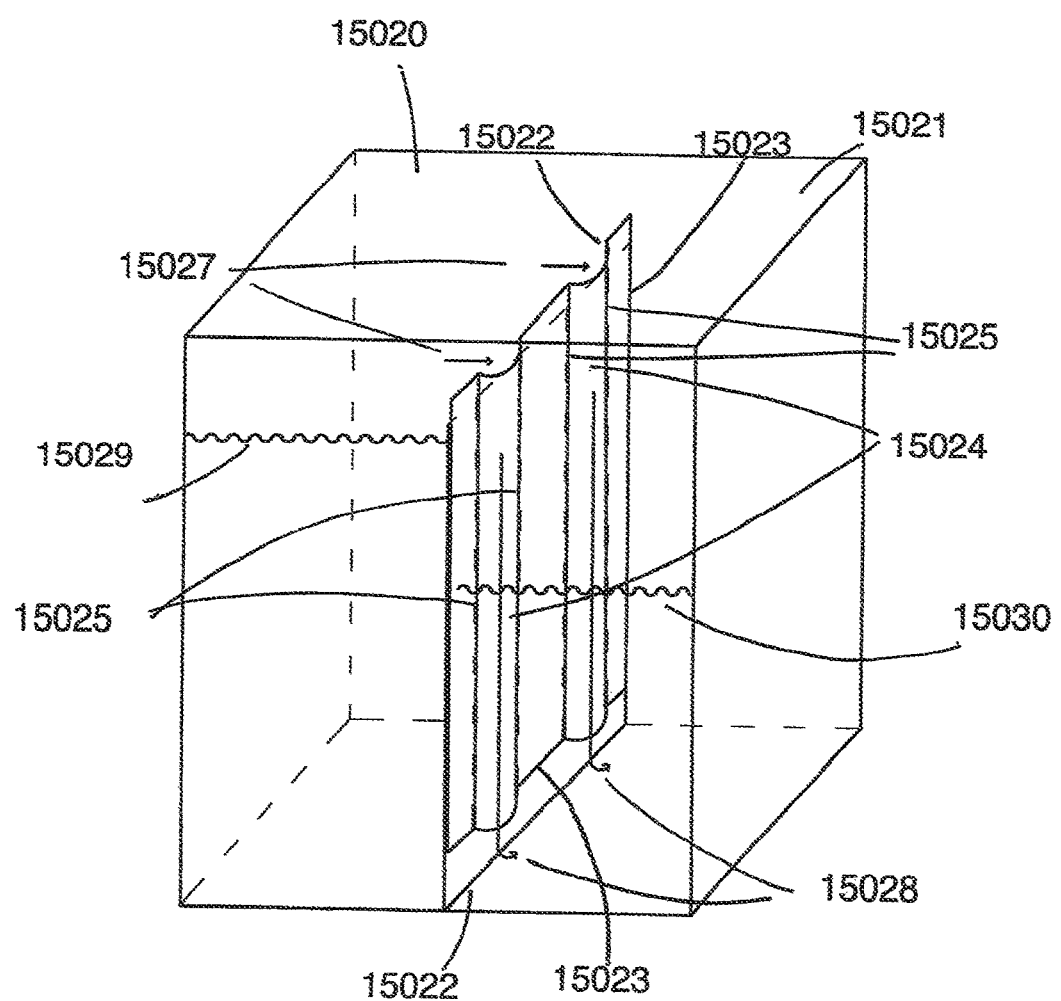

FIG. 15C illustrates embodiments of expandable reservoirs for a recirculating anaerobic digester according to the invention.

Figure 16A:
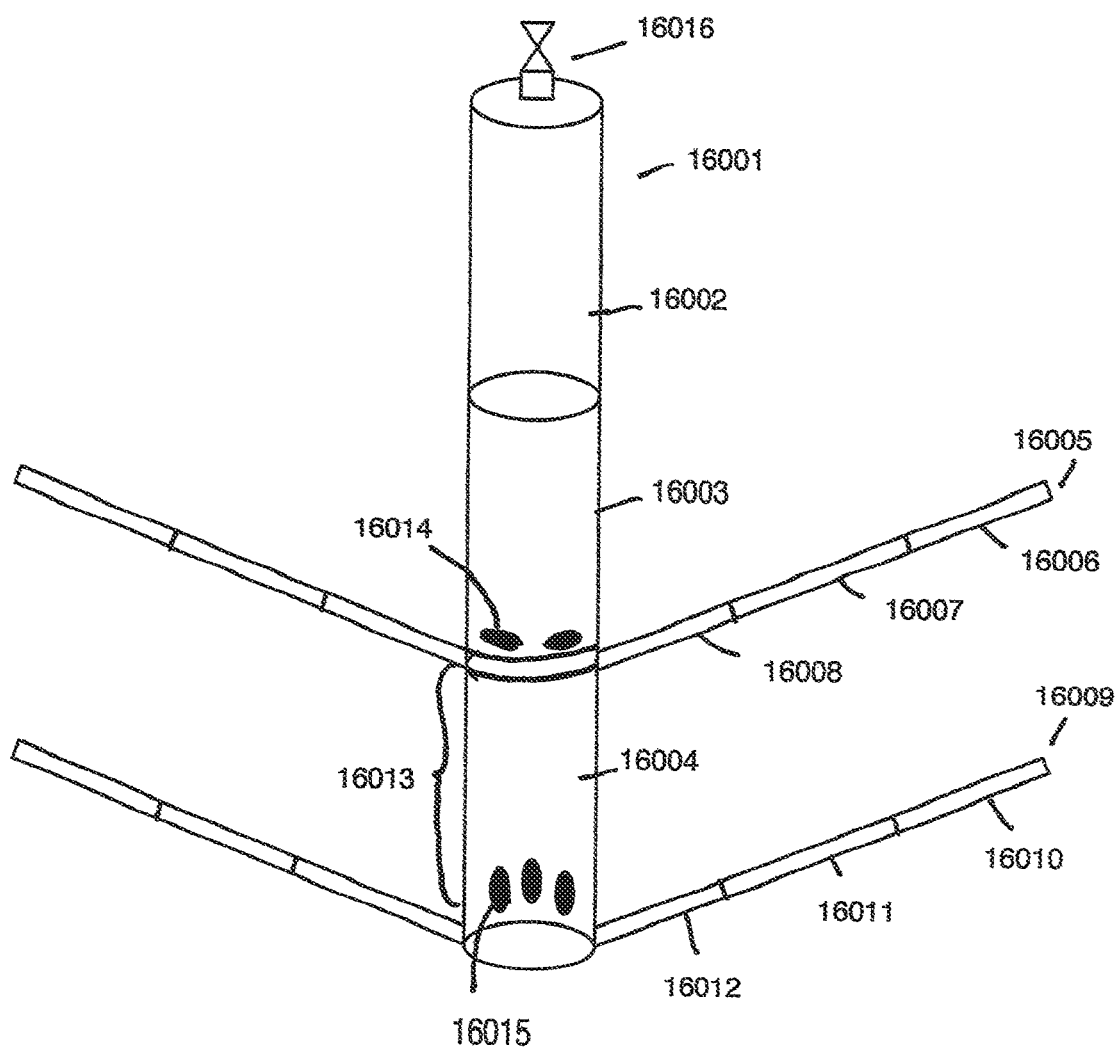
Figure 16B:
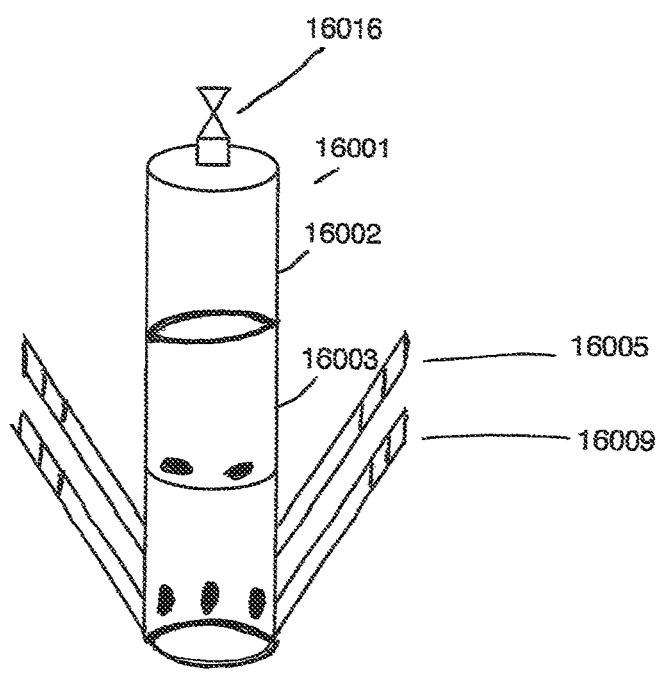

FIG. 16A-B illustrates a telescoping internal support frame with telescoping, hinging support cross members in an extended configuration and a collapsed configuration.

FIG. 17 illustrates an embodiment of an internal support cross member assembly with length adjustable support cross members in an umbrella configuration.

Figure 18B:
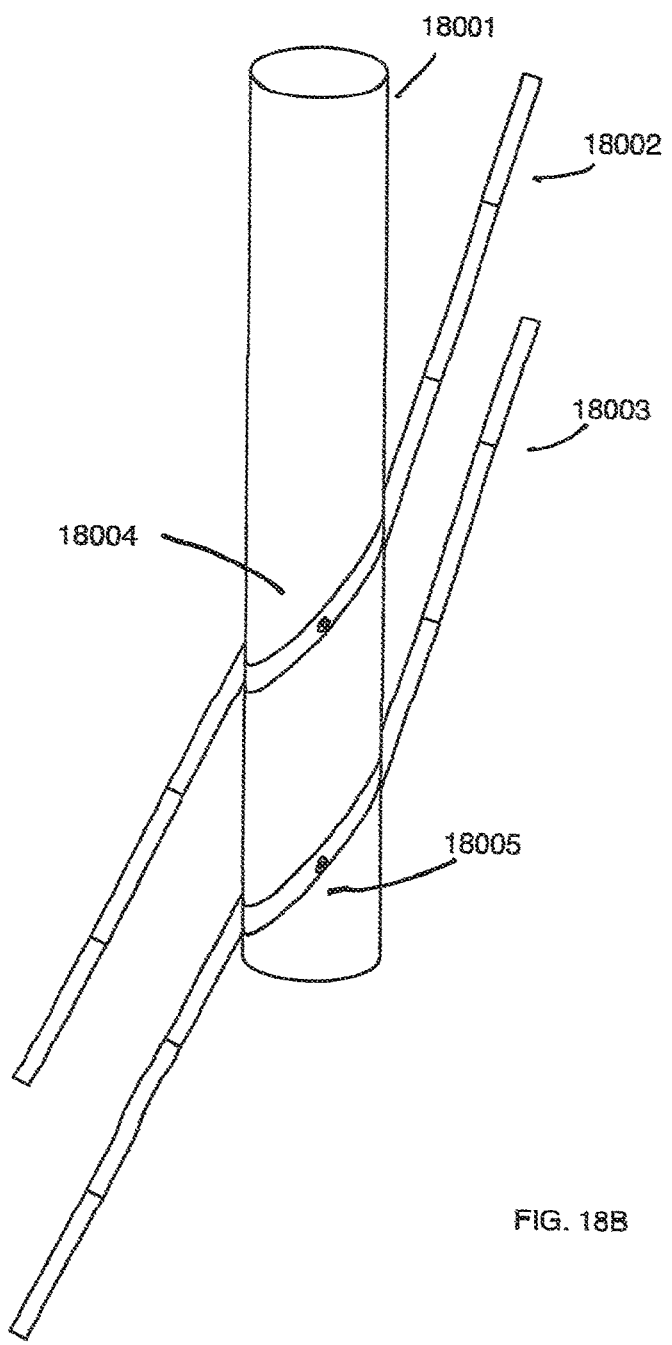

FIG. 18A-B illustrates an embodiment of a support cross member assembly with hingedly connected telescoping support cross members.

Figure 19:
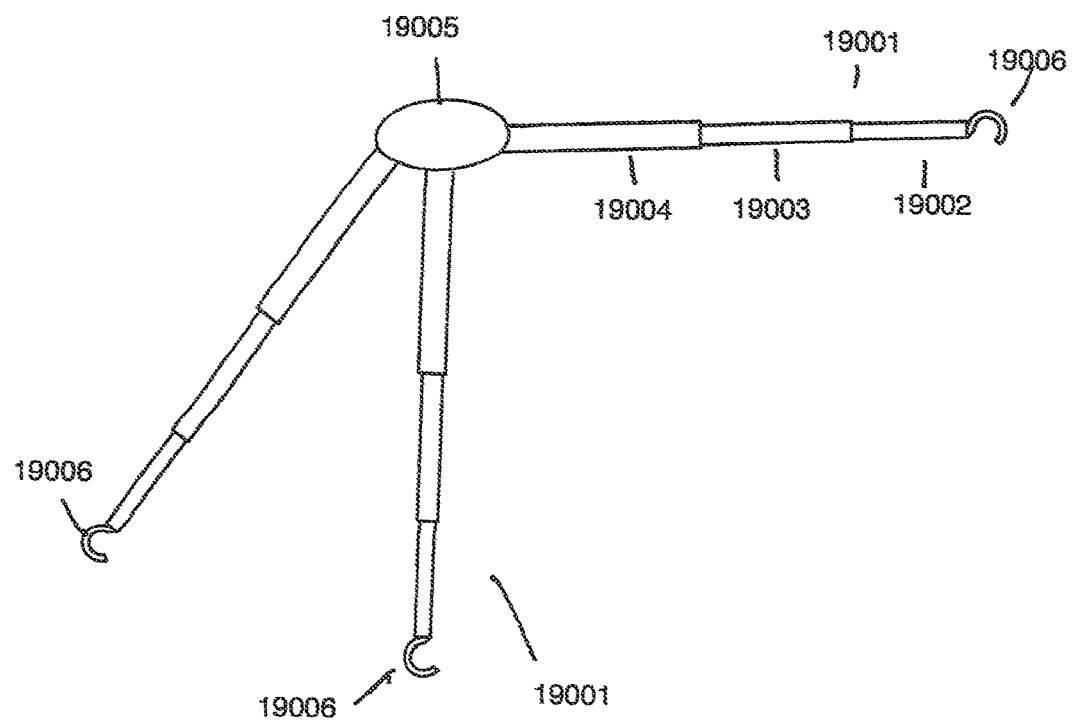

FIG. 19 illustrates an internal support cross member assembly with attachment hooks for a reservoir assembly.

Figure 20A:
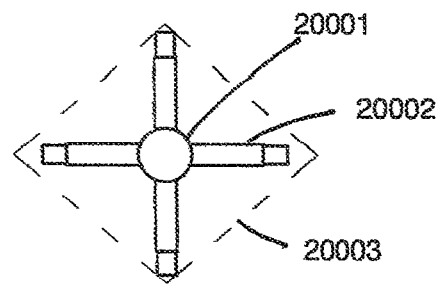
Figure 20B:
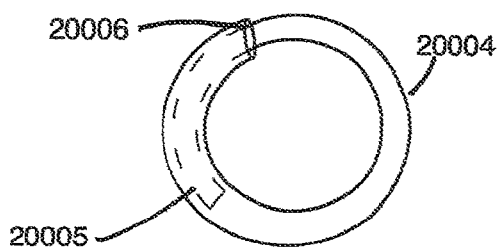
Figure 20C:
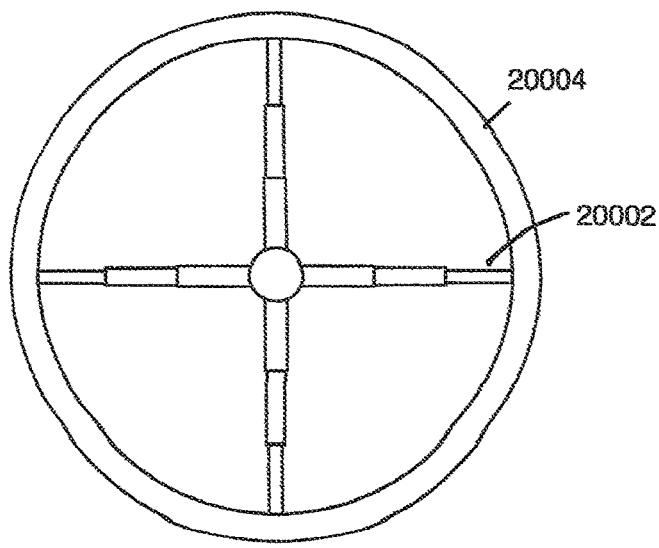

FIG. 20A-C illustrates an embodiment of a size-adjustable insert with an elastic sheet of material.

Figure 21A:
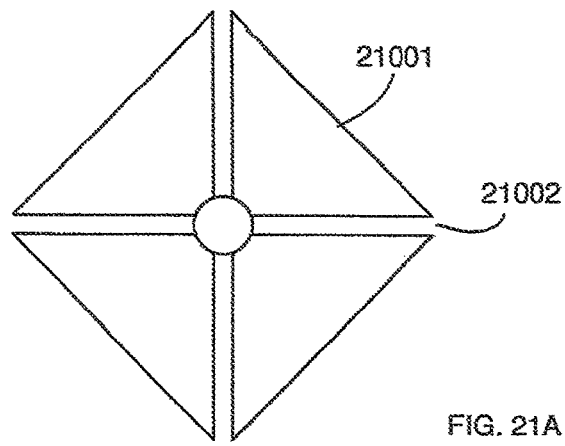
Figure 21B:
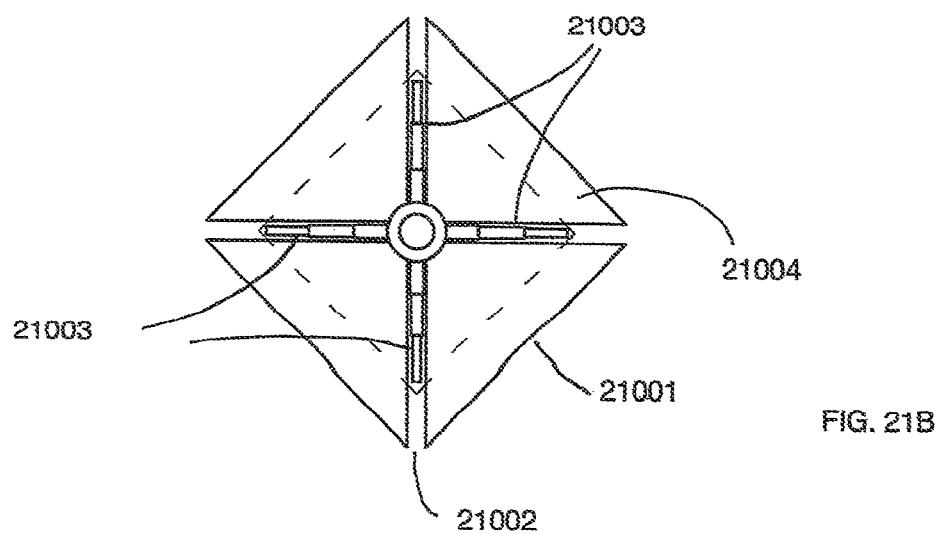

FIG. 21A-B illustrates an embodiment of a size-adjustable insert with a sheet of material having sleeves.

Figure 22A:
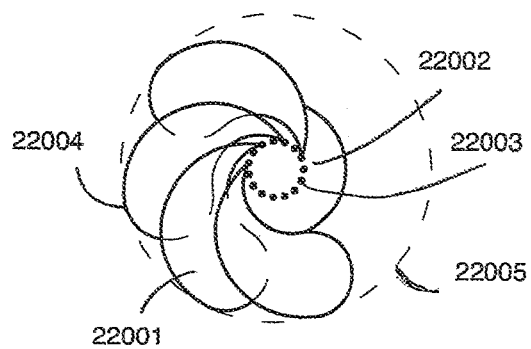
Figure 22B:
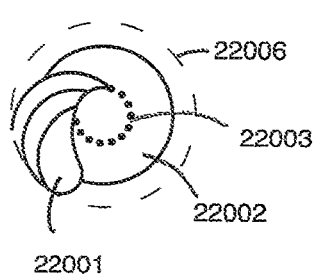
Figure 22C:
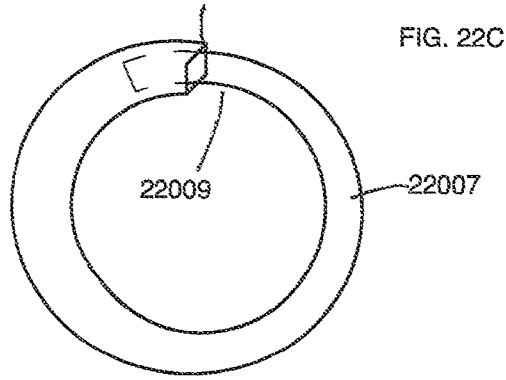

FIG. 22A-C illustrates an embodiment of a size-adjustable insert with adjustable lamellae.

Figure 23A:
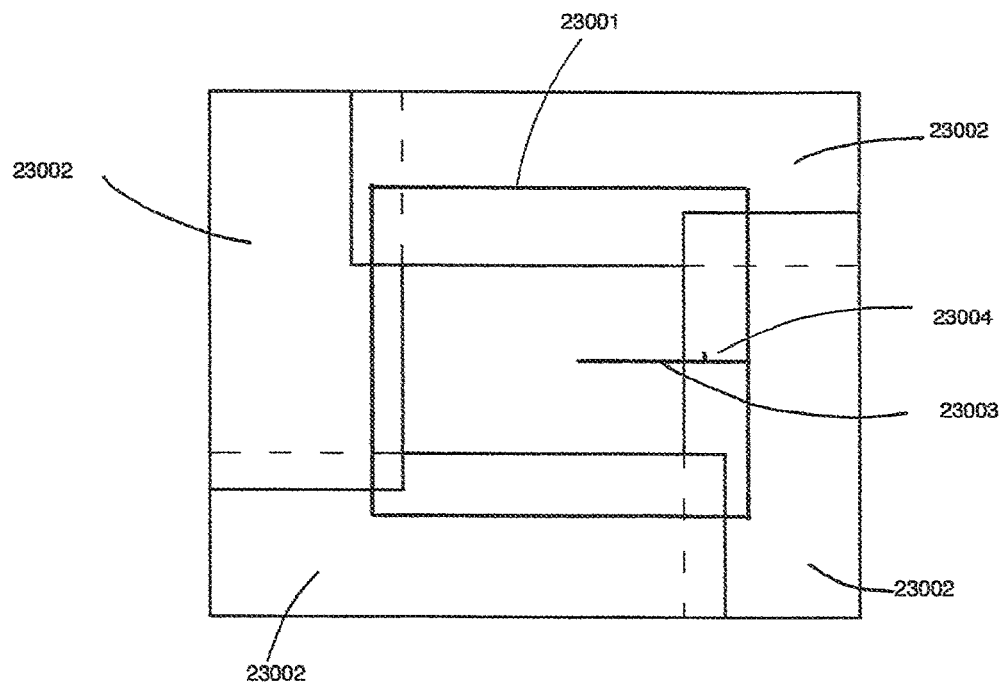
Figure 23B:
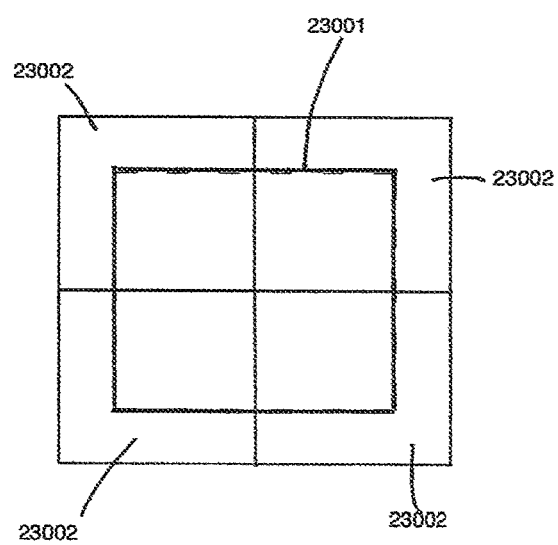

FIG. 23A-B illustrates an embodiment of size-adjustable insert with adjustable tessellated sheets of material.

DETAILED DESCRIPTION

Some embodiments of the invention may be configured as biological trickle filters. Some embodiments of the invention may be configured as clarifiers. Some embodiments of the invention may be configured as combinations of biological trickle filters and clarifiers.

FIG. 2A illustrates a cross sectional view of an exemplary embodiment of a biological trickle filter/clarifier combination according to the invention in an expanded configuration. Construction of separate biological trickle filters and clarifiers may be entirely analogous, and those with ordinary skills in the art will not have any problems envisioning and constructing separate trickle filters and clarifiers based on this disclosure.

Reservoir assembly 2000 comprises reservoir 2001 having an upper chamber configured as a biological medium compartment 2002 holding biological medium carrier 2011, a lower chamber configured as a clarifier compartment 2003, separator 2004, internal drain 2005, and floor 2006. The embodiment further comprises water outlet 2007, sediment outlet 2008, support frame 2009 and spray nozzle 2010, access hatch 2012, water inlet 2013, recirculation pump 2014 and recirculation outlet 2015.

Separator 2004 separates biological medium compartment 2002 and clarifier compartment 2003. Biological medium compartment 2002 is configured to hold a biological medium carrier 2011.

During operation of embodiments of the invention water to be treated is introduced through inlet 2013, pumped by recirculation pump 2014 through recirculation outlet 2015 to spray nozzle 2010, and sprayed over biological medium carrier 2011 in biological medium compartment 2002. Biological medium carrier 2011 carries a biofilm of microbes digesting contaminants in the water. The water flows over biological medium carrier 2011 to separator 2004, where it is collected into internal drain 2005. Internal drain 2005 drains the water into clarifier compartment 2003, preferably to its lower levels. Sediment is allowed to settle in clarifier compartment 2003, and the purified water is allowed to rise to recirculation outlet 2015 to be retreated, or to water outlet 2007 for release or further treatment. The sediment can be removed through sediment outlet 2008.

The exemplary embodiment illustrated in FIG. 2A has been expanded from a collapsed configuration illustrated in FIG. 2B into an expanded configuration illustrated in FIG. 2A.

Embodiments of the invention may comprise an expandable reservoir 2001 having a collapsed configuration with a first volume and an expanded configuration with a second volume. In some preferred embodiments of the invention the second volume is at least four times larger than the first volume.

Functions of expandable reservoir 2001 may include accommodating the flow of water subject to treatment, holding other components of the system, as well as providing structural support for the water treatment system. In the embodiment shown, reservoir 2001 is of a flexible sheet construction, but other constructions are possible under the scope of the invention, as is disclosed in more detail below.

The expandable reservoir may have a variety of constructions, including, but not limited to, a flexible or pliable sheet construction, (FIG. 3A), an accordion construction (FIG. 3B), and a telescope construction (FIG. 3C). Flexible sheet constructions may be folded, as in FIG. 3A or rolled, as in FIG. 3D, in the collapsed configuration of the reservoir. The reservoir illustrated in FIG. 2A is of a flexible sheet construction, and has been expanded from a collapsed configuration as shown in FIG. 2B.

Suitable materials of construction for reservoir 2001 may include metals, like stainless steel, copper and galvanized iron, and polymeric components like poly-ethylene, poly-propylene, nylons, poly-ethylene terephtalate and poly-urethanes. For some embodiments or components of the invention, like flexible chambers, composite materials, like fiber-reinforced plastic sheets may be suitable.

The embodiments of the invention may have different types of shapes and cross sections, including circular, triangular, square or rectangular cross-sections, or custom cross-sections for specific requirements from a location for the device.

In some embodiments reservoir 2001 may be a separate entity. In such embodiments reservoir 2001 may be connected with other components of the embodiment, such as separator 2004 and floor 2006, during assembly of the water treatment system in the field.

In preferred embodiments of the invention, a separate reservoir 2001 may have pre-fabricated accommodations for the other components, such as slots, hooks, eyelets, sleeves, toggles or other connection points through which components can be connected with reservoir 2001. In other embodiments the components may be connected through techniques like gluing, riveting, sewing or welding. In some embodiments the other components may be supported by a support frame, as disclosed in more detail further below.

In some preferred embodiments of the invention reservoir 2001 may be integrated into a single unit with one or more other components of the water treatment system, such as the separator 2004, drain 2005 and floor 2006 into a reservoir assembly 2000, wherein the reservoir assembly 2000 is expandable from a collapsed configuration having a first volume to an expanded configuration having a second volume. Integration of other components of the system with reservoir 2001 may facilitate and speed up erection of the system in the field.

In some embodiments of the invention reservoir 2001 or reservoir assembly 2000 may be supported by a support frame to maintain an expanded configuration, as will be disclosed in more detail below. For instance, reservoir 2001 illustrated in FIG. 2A, having a flexible sheet construction, is illustrated being supported by support frame 2009. Other reservoirs according to the invention, for instance those with a telescoping construction made of at least somewhat rigid materials, may be self-supporting once the segments of the telescoping construction have been locked in place, for instance by threaded fasteners, rivets, welding, gluing or snap-fit locking systems.

Embodiments of the invention may comprise a separator 2004. Functions of separator 2004 may include separating biological medium compartment 2002 from clarifier compartment 2003, collecting treated water from biological medium compartment 2002, funneling water to drain 2005, and providing structural support to other components of the water treatment systems.

Figure 1:
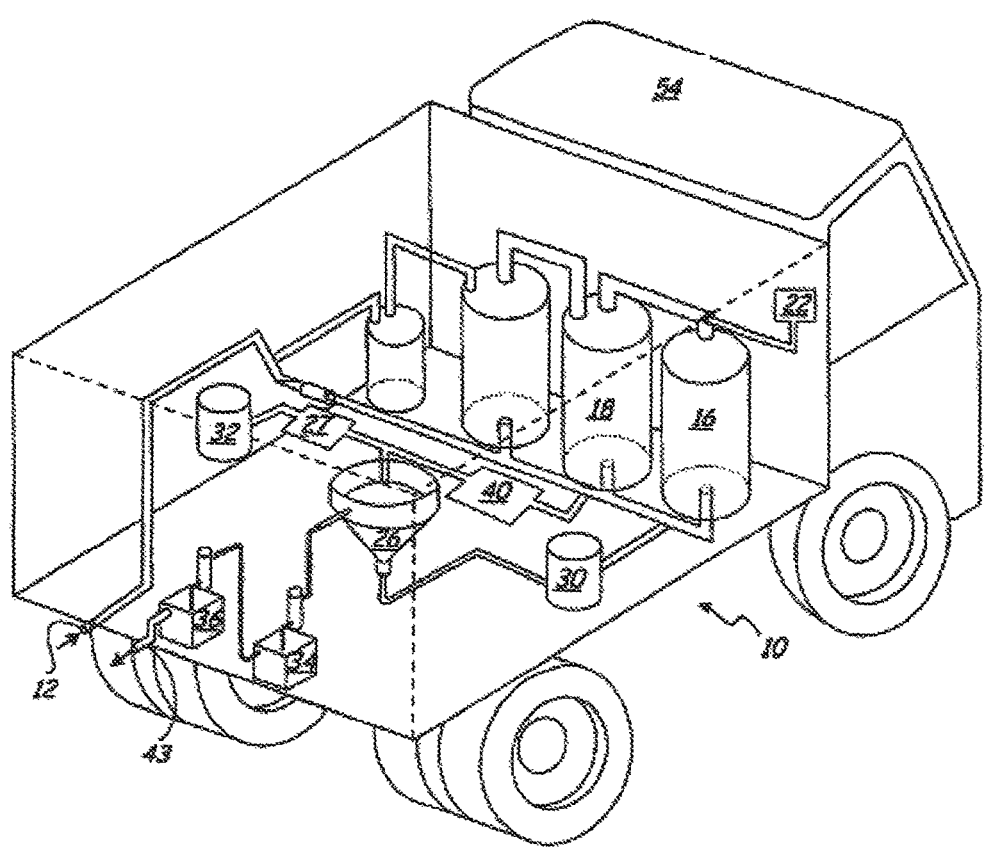
Figure 5E:
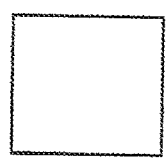

Separator 2004 may be of a variety of constructions, including, but not limited to, a flexible, pliable sheet (FIGS. 4A and 5A), a foldable accordion (FIGS. 4B and 5B), a set of slidably connected segments, expandable to a full disc (FIGS. 4C and 5C), a foldable, an umbrella-type construction (FIGS. 4D and 5D), and a solid rigid sheet or disk (FIGS. 4E and 5E). The cross-section of separator 2004 may be any shape required to match the other components of the device, including circular, oval, square rectangular, triangular or custom-designed cross sections. Separator 2004 may be pre-shaped to specified dimensions during manufacturing, or may shaped in the field by cutting or otherwise sizing piece of material.

Suitable materials of construction for separator 2004 may include metals, like aluminum, stainless steel, copper and galvanized iron, and polymeric components like poly-ethylene, polypropylene, nylons, poly-carbonates and poly-urethanes and poly-ethylene terephthalate. For some embodiments or components of the invention composite materials, like fiber-reinforced polymeric materials, may be suitable.

In some embodiments separator 2004 may be a separate entity. In such embodiments separator 2004 may be connected with reservoir 2001 during assembly of the water treatment system in the field. In preferred embodiments of the invention, separator 2004 may have pre-fabricated accommodations for the reservoir, such as slots, hooks, eyelets, sleeves, toggles or other connection points through which separator 2004 can be connected with reservoir 2001. In other embodiments separator 2004 may be connected through techniques like gluing, riveting, sewing or welding. In some embodiments separator 2004 may be supported by a support frame, as disclosed in more detail further below.

In some preferred embodiments separator 2004 may be integrated with reservoir 2001 into a single unit as a reservoir assembly. For instance, a reservoir 2001 in the form of a foldable, pliable sheet as in FIG. 2A may be integrated with a separator 2004 having a foldable pliable sheet design as in FIGS. 4A and 5A, forming an integrated, foldable reservoir assembly. Separator 2004 may be integrated with reservoir 2001 by any type of known methods for connecting flexible sheets of material, including gluing, sewing, riveting and plastic welding.

In some preferred embodiments separator 2004 may be of a rigid disk or rigid shallow funnel construction, as illustrated in FIGS. 2A and 2B, and be integrated with a flexible reservoir 2001 into a reservoir assembly 2000. In such embodiments reservoir assembly 2001 may be in a collapsed configuration as shown in FIG. 2B, incorporating a rigid separator 2004 in the collapsed configuration.

In other preferred embodiments, a reservoir with a fixed diameter, for instance an accordion construction as in illustrated FIG. 3B or a telescope construction as in FIG. 3C, may be integrated with a separator with a fixed diameter, such as a solid disk separator or sheet separator as illustrated in FIGS. 4E and 5E.

In some embodiments the separator may be combined with other components of the embodiment into a separator assembly. For instance, in some embodiments of the invention separator 2004 and internal drain 2005 may be combined in a single separator assembly. The separator assembly may be integrated with reservoir 2001 into a reservoir assembly 2000. In some embodiments separator 2004 may be supported by internal drain 2005, as will be disclosed in more detail below. In some embodiments separator 2004 may be of a construction and material that are rigid enough to support biological medium carrier 2011 and water in biological medium compartment 2002. In alternative embodiments, separator 2004 may be reinforced by support cross members.

Embodiments of the invention may comprise a drain 2005. Functions of drain 2005 may include being a conduit for treated water from biological medium compartment 2002 to clarifier compartment 2003, directing water to the lower levels of clarifier compartment 2003 to facilitate sedimentation of solids, and supporting other components of the water treatment device, such as separator 2004.

Drain 2005 may be of a variety of constructions, but may typically comprise a tube-like configuration. The cross-section of drain 2005 may be any shape required to function within the system, including circular, oval, square rectangular, triangular or custom-designed cross sections. Constructions for the drain may include a rigid tube, a flexible, pliable tube, a foldable accordion, and a telescoping tube.

Suitable materials of construction for drain 2005 may include metals, like aluminum, stainless steel, copper and galvanized iron, and polymeric components like poly-ethylene, polypropylene, nylons, poly-carbonates and poly-urethanes and poly-ethylene terephthalate. For some embodiments or components of the invention composite materials, like fiber-reinforced polymeric materials, may be suitable.

In some embodiments drain 2005 may be a separate entity. In such embodiments drain 2005 may be connected with separator 2004 during assembly of the water treatment system in the field. In preferred embodiments of the invention, drain 2005 may have pre-fabricated accommodations for separator 2004, such as slots, hooks, eyelets, sleeves, toggles or other connection points through which drain 2005 can be connected with separator 2004. In other embodiments drain 2005 may be connected through techniques like gluing, riveting, sewing or welding.

In some embodiments drain 2005 may be combined with other components of the embodiment into an assembly. For instance, as disclosed above, in some embodiments of the invention separator 2004 and internal drain 2005 may be combined in a single separator assembly.

In some embodiments, as shown in FIG. 2C, drain 2005 may be of a rigid construction and may be integrated with and support separator 2004. In such embodiments drain 2005 advantageously may have water exit holes 2016 towards its lower section, in order to deliver water from biological medium compartment 2002 to the lower levels of clarifier compartment 2003.

In some embodiments drain 2005 may be combined with a central support frame, as disclosed in more detail further below.

In the exemplary embodiment of FIG. 2C, drain 2005 is illustrated in a tube-like configuration integrated with separator 2004. In preferred embodiments of the invention, drain 2005 runs internal to reservoir 2001, as illustrated in FIG. 2A-2B. However, the invention is not so limited, and in some embodiments drain 2005 may run external to reservoir 2001.

Embodiments of the invention may comprise a floor 2006. Functions of floor 2006 may include collecting sediment in clarifier compartment 2003, directing sediment to sediment outlet 2008, and providing structural support for the water treatment system.

Similar to separator 2004, floor 2006 may be of a variety of constructions, including, but not limited to, a flexible, pliable sheet (FIGS. 4A and 5A), a foldable accordion (FIGS. 4B and 5B), a set of slidably connected segments, expandable to a full disc (FIGS. 4C and 5C), a foldable, umbrella-type construction (FIGS. 4D and 5D), and a solid, rigid sheet or disk (FIGS. 4E and 5E). The cross-section of floor 2006 may be any shape required to match the other components of the device, including circular, oval, square rectangular, triangular or custom-designed cross sections.

In some embodiments floor 2006 may have a funnel-type construction, directed at a central sediment outlet 2008, as illustrated in FIG. 2A. In alternative embodiments floor 2006 may be of a flat, slanted construction, directed at a peripherally located sediment outlet 2008 (FIG. 2C).

In some embodiments floor 2006 may be entirely omitted, for instance in embodiments with a reservoir with a bag-like configuration. In such embodiments a sediment outlet may be integrated with the reservoir into a single unit, at or near the bottom of the reservoir.

Floor 2006 may be pre-shaped to specified dimensions during manufacturing, or may shaped in the field by cutting or otherwise sizing piece of material.

Suitable materials of construction for floor 2006 may include metals, like aluminum, stainless steel, copper and galvanized iron, and polymeric components like poly-ethylene, polypropylene, nylons, poly-carbonates and poly-urethanes and poly-ethylene terephthalate. For some embodiments or components of the invention composite materials, like fiber-reinforced polymeric materials, may be suitable.

In some embodiments floor 2006 may be a separate entity. In such embodiments floor 2006 may be connected with reservoir 2001 during assembly of the water treatment system in the field. In preferred embodiments of the invention, floor 2006 may have pre-fabricated accommodations for the reservoir, such as slots, hooks, eyelets, sleeves, toggles or other connection points through which floor 2006 can be connected with reservoir 2001. In other embodiments floor 2006 may be connected through techniques like gluing, riveting, sewing or welding. In some embodiments floor 2006 may be supported by a support frame, as disclosed in more detail further below.

In some preferred embodiments floor 2006 may be integrated with reservoir 2001 into a reservoir assembly. For instance, a reservoir 2001 in the form of a foldable, pliable sheet as in FIG. 2A may be integrated with a floor 2006 having a foldable pliable sheet design as in FIGS. 4A and 5A, forming an integrated, foldable reservoir assembly. Floor 2006 may be integrated with the reservoir by any type of known methods for connecting flexible sheets of material, including gluing, sewing, riveting and plastic welding.

In some preferred embodiments floor 2006 may be of a rigid disk or rigid shallow funnel construction, and be integrated with a flexible reservoir 2001 into a reservoir assembly 2000. In such embodiments reservoir assembly may be in a collapsed configuration as shown in FIG. 2B, incorporating a rigid floor 2006 in the collapsed configuration.

In other preferred embodiments, a reservoir 2001 with a fixed diameter, for instance an accordion construction as in illustrated FIG. 3B or a telescope construction as in FIG. 3C, may be integrated with a floor 2006 with a fixed diameter, such as a solid disk floor or sheet as illustrated in FIGS. 4E and 5E.

In some embodiments floor 2006 may be combined with other components of the embodiment into a floor assembly. For instance, in some embodiments of the invention floor 2006 and internal drain 2005 may be combined in a single floor assembly. The floor assembly may be integrated with reservoir 2001 into a reservoir assembly 2000. In some embodiments floor 2006 may support drain 2005. In some embodiments floor 2006 may be of a construction and material that are rigid enough to support water clarifier compartment 2003. In alternative embodiments, floor 2006 may be reinforced by support cross members.

Functions of spray nozzle 2010 may include distributing water to be treated over the biological medium carrier. The spray nozzle may be combined with other components of the water treatment system to form a spray nozzle assembly. For example, as will be disclosed in more detail below, a spray nozzle assembly may comprise a spray nozzle 2010 located on a central hub, and a number of support cross members hingedly connected to the hub, and configured to be expandable like the arms of an umbrella.

In addition to supporting a spray nozzle 2010, a spray nozzle assembly may function as a structural support for a support frame or reservoir assembly.

Spray nozzle 2010 may be a custom-designed device, or a commercially available of-the-shelf design. Multiple spray nozzles may be comprised in embodiments of the invention. Spray nozzle 2010 may be in a fixed location, or may be mounted on a moveable part of the system, like a rotatable arm (Not shown).

Functions of water outlet 2007 may include draining of treated water from clarifier compartment 2003. Water outlet 2007 may be included at any level of clarifier compartment 2003. In preferred embodiments of the invention water outlet 2007 is located an upper level of clarifier compartment 2003 to allow settling of sediment in the lower levels. Water outlet 2007 may be of any type of desired design, including standard commercially available valves or specifically designed conduits for recirculating the treated water into the equipment. Multiple water outlets may be present under the scope of the invention.

Functions of sediment outlet 2008 outlet may include removal of sediment from the clarifier compartment. The sediment outlet may be configured to route sediment to other equipment within a treatment plant, to be collected manually, or any other suitable means of sediment capture and processing.

Some embodiments may one or more access hatches 2012. Access hatch 2012 may be advantageous to inspect the interior of the digester to allow for periodic cleaning, to observe that all visible components are working properly and to check the quality of water leaving the digester.

Functions of water inlet 2013, recirculation outlet 2015 and recirculation pump 2014 include providing water and an ongoing water flow throughout the system. Recirculating the water may be beneficial to providing purified water of high quality. In some embodiments the components may be standard available plumbing fixtures. In other embodiments parts of water inlet 2013 and recirculating outlet 2015, like sleeves to provide a water channel and an attachment point for a valve, may be integrated with reservoir 2001.

Functions of clarifier compartment 2003 may include collecting treated water from biological medium compartment 2002, allowing sedimentation of solids and providing a reservoir of treated or partially treated water for release or further treatment. The water may be introduced at any level of clarifier compartment 2003. In preferred embodiments water is introduced towards the bottom of clarifier compartment 2003, as illustrated in FIG. 2A, to facilitate sedimentation of solids in clarifier compartment 2003.

As the water rises in the clarifier compartment, solids in the water may settle at the bottom of the clarifier compartment 2003, leaving purified or partially purified water at the higher levels.

In some embodiments the clarifier compartment may comprise a funnel shaped bottom, as shown in FIGS. 2A and 2B, connected to a sediment outlet. In other embodiments the clarifier compartment may comprise a flat, optionally slanted floor 2006, as shown in FIG. 2C.

Functions of biological medium compartment may include holding biological medium carrier 2011 and accommodating the flow of water being treated.

In some embodiments biological medium compartment 2002 may be a part of expandable reservoir 2001. In some embodiments biological medium compartment 2002 may comprise a separate container for biological medium carrier 2011, inserted into expandable reservoir 2001. A separate container may facilitate exchanging the biological medium carrier 2011 when required.

Some embodiments of the invention comprise support frames or components for the construction of support frames configured to support reservoirs or reservoir assemblies.

Some support frames comprise a perimeter configuration. Some perimeter frames may be external to a reservoir assembly according to the invention. Some perimeter frames may be internal to a reservoir assembly according to the invention.

Some support frames comprise a configuration having a central location, for instance in the form of a central upright support member having a number of radially oriented support cross members. In some embodiments a central upright support frame may be located along a vertical axis of a reservoir assembly.

Some embodiments of the invention comprise individual support frame members that can be assembled in the field to create a support frame by a variety of fasteners and connectors, such a nuts and bolts, snap-fasteners and threaded ends. Alternatively, connecting hubs may be used connecting frame members with a male-female insert mechanism.

Some embodiments of the invention comprise support frames in a collapsed configuration that can be expanded in the field into an expanded configuration.

Some expandable support frames according to the invention are expandable in a radial orientation, for instance in an umbrella-like configuration. Some expandable frames according to the invention are expandable in a linear orientation, for instance in an accordion-like or telescope-like configuration.

Some expandable support frames according to the invention are expandable through movement of hingedly connected frame members.

Some expandable support frames according to the invention are expandable through movement of telescopingly connected frame members.

The tables below provides an overview of some exemplary embodiments and illustrations of support frame configurations according to the invention.

| Perimeter Frames | Figure |
| --- | --- |
| Hinging Cross Members | 6A |
| Hinging Outer Members | 6B |
| Telescoping Outer Members | 6C |
| Telescoping Cross Members | 6D |

| Central Frames | Figure |
| --- | --- |
| Hinging Cross Members | 7A |
| Hinging (Folding) Central Post | 6B |
| Telescoping Cross Members | 6C |
| Telescoping Central Post | 6D |

Some embodiments of the invention utilize support cross members for their construction. Some cross members may be comprised in embodiments of the invention.

Some embodiments of the invention comprise individual cross members that can be assembled in the field to create a support cross member assembly.

Some embodiments of the invention comprise support cross member assemblies in a collapsed configuration that can be expanded in the field.

Support cross member assemblies according to the invention may comprise a central hub with a number of hingedly attached cross members that can be opened like the arms of an umbrella (FIG. 8A). Alternatively, support cross members may hinge around a central pivot point FIG. 8B.

Functions of the support cross members may include providing support for a support frame, for a reservoir, or for other components of a water treatment system, like a spray nozzle, separator, floor and other components described below.

Attachment of the reservoirs to the support frames and the support cross members may be permanent or temporary, and may be performed at various times, for instance during fabrication at a factory or during construction in the field. They may be connected with a variety of attachment features, for instance loops, sleeves, toggles, straps, hooks and the like.

Some preferred embodiments of the invention comprise an umbrella-type support frame, an exemplary embodiment of which is illustrated in FIGS. 9A and 9B.

An upright central support member 9001 is connected with 3 sets of support cross members 9002, wherein the support cross members are moveable between a collapsed configuration shown in FIG. 9A and an expanded configuration shown in FIG. 9B. Each set of support cross members 9002 is connected with upright support member 9001 through a fixed hub 9003. Support cross members 9002 may be expanded by sliding a slider hub 9004 with expander members 9005 from a collapsed position as illustrated in FIG. 9A to an expanded position as illustrated in FIG. 9B, similar to opening an umbrella.

In some embodiments, upper support cross members 9002 may be used as supports from which a biological medium carrier 2011 can be suspended. Middle support cross members 9002 may be used to support a separator 2004. Lower support cross members 9002 may be used to support a floor 2006.

Central support frames 9001 may be combined with drains 2005 into a support-drain assembly. For instance, a hollow central upright support member may have water inlet holes above the level of separator 2004, and water outlet holes above the level of floor 2006, thus functioning as a support frame and as a drain.

The embodiment in FIGS. 9A and 9B is intended only as an illustration of potential uses and applications of a central support frame. Those with ordinary skills in the art of civil engineering or water treatment plant construction will easily be able to envision and construct other embodiments falling under the scope of the invention.

In some embodiments a hinging frame may comprise a threaded actuator like in a scissor jack, as illustrated in FIGS. 10A and 10B. FIG. 10A shows an expandable frame 10001, having a threaded actuator 10002, in a collapsed configuration. Threaded female receiver 10003 is moveable along threaded actuator 10002, female receiver 10004 is in a fixed position on treaded actuator 10002, but does allow rotation of threaded end 10001. Alternatively, female receiver 10004 may be threaded and moveable along threaded actuator 10002. Expansion of frame 10001 from a collapsed configuration in FIG. 10A to an expanded configuration in FIG. 10B may be achieved by rotating threaded actuator 10002 as indicated by arrow 10005. If desired, the excess length of threaded actuator 10002 may be removed, for instance by providing actuator 10002 as a two-piece unit. For clarity, only a front and 1 side view are shown, the dotted line indicates an outline of the entire frame. The figures are not drawn to scale.

Reservoirs according to the invention may be attached to a support frame by any suitable or desirable means, such as slots, hooks, eyelets, sleeves, toggles or other connection points through which frame components can be connected with reservoir components. In some embodiments the reservoirs may be attached to a frame by the use of a bolt rope construction, for instance where a bolt rope attached to a reservoir slides into a channel on a frame member. Bolt ropes constructions may allow for easy hoisting up of a reservoir in a frame.

Some embodiments of the invention comprise a biological medium carrier 2011, for instance as illustrated in FIG. 2A. Functions of biological medium carrier 2011 may include supporting a biological medium in the form of a film of microbes digesting waste components in the water being treated, distributing a flow of water over the biological medium and providing an aerated surface to the film of microbes and the water. Other functions may include structurally supporting the expandable reservoir.

In some embodiments biological medium carrier 2011 may be a separate component of a trickle filter/clarifier system, and may be introduced into biological medium compartment 2002 after erection of the system. In some embodiments biological medium carrier 2011 may be an integral part of a trickle filter/clarifier system, and may be integrated with reservoir assembly 2000 into a single unit.

Biological medium carrier 2011 may be of an expandable construction. In some embodiments, biological medium carrier 2011 may comprise solid, non-compressible components, like ropes, sheets, rods and the like. Such embodiments may be packed in densely stacked configurations to reduce volume during transportation, and may be expanded during set-up of the water treatment system by physically moving the components apart to achieve the desired void space in the biological medium compartment.

In some embodiments biological medium carrier 2011 may comprise a porous, compressible matrix of a flexible or elastomeric material like an open cell foam or a coiled or randomly packed configuration of fibers. Such matrices may be compressed by simple mechanical pressure, or by constraining the matrices in a hermetically sealed bag and evacuating the bag. Expansion in the field can be achieved by releasing the mechanical pressure or the vacuum.

Some embodiments of biological medium carrier 2011 may comprise a hybrid construction, in which flexible materials of low elasticity are arranged in an expandable three-dimensional structure, like an expandable honey comb arrangement, which may be expanded from a collapsed to an expanded configuration.

Preferred materials for expandable biological medium carriers 2011 may include polymeric components like polyethylene, polypropylene, nylons, poly-carbonates and poly-urethanes, polystyrene and poly-ethylene terephthalate.

Additional suitable materials may include elastically deformable polymers (Elastomers), such as rubbers, polybutadiene, and many poly-urethanes and silicones.

Additionally the devices may comprise self-expanding composites, for instance, spring-loaded polymeric devices.

In some embodiments of the invention biological medium carrier 2011 may be a separate entity, and may be inserted into biological medium compartment 2002 during assembly of the water treatment system in the field.

In some embodiments biological medium carrier 2011 may be contained within a flexible bag or container to facilitate collapsing and insertion into, and removal out of biological medium compartment 2002.

In some embodiments, a biological medium carrier 2011 in the form of an expandable 3-dimensional matrix may be integrated with other components of a water purification system, for instance with an expandable reservoir, an example of which is illustrated in FIGS. 2A and 2B. Expandable biological medium carrier 2011 is integrated with biological medium compartment 2002, which is part of expandable reservoir 2001. Biological medium carrier 2011 and biological medium compartment 2002 are shown in an expanded configuration in FIG. 2A and in a collapsed configuration in FIG. 2B.

Methods to expand the biological medium carrier 2011 may include inflation of expandable reservoir 2001, attaching carrier 2011 to the wall of the biological medium compartment 2002 of expandable reservoir 2001, which allows expansion to occur upon expansion of the expandable reservoir 2001, and expansion of expandable perimeter frame 2009 attached to expandable reservoir 2001.

Alternatively, if a sufficiently strong self-expanding material is used for expandable biological medium carrier 2011, allowing carrier 2011 to expand may cause expansion of expandable reservoir. In this case, biological medium carrier 2011 may act as a structural component of the water purification system.

In some embodiments, multiple biological medium carriers may be combined into structural arrays, as illustrated in FIG. 11. Such structural arrays may advantageously be combined with other components of a water purification system.

For instance, some water purification systems may have an upright central support member, often running along a central vertical axis of the water purification system. As illustrated in FIG. 11, such a support member 11001, shown in a top-down view in FIG. 11, may be attached to a number of sheet-shaped biological medium carriers 11002, wrapped around support member 11001 in a propeller like fashion. Biological medium carriers 11002 may be moved from a collapsed configuration 11003 to an expanded configuration 11004 by rotating support member 11001.

Alternatively, as illustrated in FIGS. 12A and B, a single sheet of material 12001 may be wrapped around an upright central support member 12002, and be unfolded from a collapsed configuration in FIG. 12A to an expanded configuration illustrated in FIG. 12B.

In alternative embodiments the movement of the support cross members, the unfolding of the biological medium carriers and the expansion of the expandable membrane may be achieved by connecting the support cross-members to the longitudinal support member through a sliding hub, like a hub on an umbrella, and attaching the biological medium carriers and the expandable reservoir to the support cross members.

In yet alternative embodiments of the invention, the biological medium carriers may be attached to other components of the water purification system, like a spray nozzle assembly with support cross members.

As illustrated in an exemplary embodiment in FIG. 13, a central post 13001, if desired supporting a spray nozzle, is hingedly connected to a number of support cross members 13002. Sheets of biological medium carrier 13003 are attached to the support cross members 13002, and may be connected to each other by biological medium carrier baffles 13004.

The collapsed configuration 13005 can be moved to the expanded configuration 13006, expanding the biological medium carrier sheets 13003 and exposing the connecting biological medium carrier baffles 13004.

In the prior art anaerobic treatment of wastewater in Upflow Anaerobic Reactors has been described, (U.S. Pat. No. 5,599,450, Feb. 4, 1997). However, whereas this prior art addresses issues of efficiency of wastewater purification, the equipment disclosed does not provide for ease of transportation or set-up in the field.

FIG. 14A illustrates a cross sectional view of an exemplary embodiment of an UASB reactor according to the invention in an expanded configuration.

Reservoir assembly 14000 comprises reservoir 14001, baffles 14002, water inlet 14003, water outlet 14004, access hatch 14005, gas outlet 14006 and sludge outlet 14007. The embodiment further comprises external frame 14009.

During operation of embodiments of the invention a sludge blanket 14008 holding an anaerobic bacteria culture is present at the lower levels of reservoir 14001. Wastewater to be treated is introduced to water inlet 14003, entering the sludge blanket 14008. Bacteria in the sludge blanket 14008 digest contaminants in the wastewater, and typically produce methane gas in the process. The wastewater is allowed to rise in reservoir 14001 and is removed through water outlet 14004. Baffles 14002 guide the methane gas produced to gas outlet 14006.

The exemplary embodiment illustrated in FIG. 14A has been expanded from a collapsed configuration illustrated in FIG. 14B into an expanded configuration illustrated in FIG. 14A.

Embodiments of the invention may comprise an expandable reservoir 14001 having a collapsed configuration with a first volume and an expanded configuration with a second volume. In some preferred embodiments of the invention the second volume is at least four times larger than the first volume.

Functions of expandable reservoir 14001 may include accommodating the flow of water subject to treatment, holding other components of the system, as well as providing structural support for the water treatment system.

The reservoir illustrated in FIG. 14A is of a flexible sheet construction, and has been expanded from a collapsed configuration as shown in FIG. 14B into an expanded configuration shown in FIG. 14A.

The expandable reservoir may have a variety of constructions, including, but not limited to, a flexible or pliable sheet construction, (FIG. 3A), an accordion construction (FIG. 3B), and a telescope construction (FIG. 3C). Flexible sheet constructions may be folded, as in FIG. 3A or rolled, as in FIG. 3D, in the collapsed configuration of the reservoir.

Suitable materials of construction for reservoir 14001 may include metals, like aluminum, stainless steel, copper and galvanized iron, and polymeric components like polyethylene, polypropylene, nylons, poly-carbonates and polyurethanes and poly-ethylene terephthalate. For some embodiments or components of the invention composite materials, like fiber-reinforced polymeric materials, may be suitable.

The embodiments of the invention may have different types of shapes and cross sections, including circular, triangular, square or rectangular cross-sections, or custom cross-sections for specific requirements from a location for the device.

In some embodiments reservoir 14001 may be a separate entity. In such embodiments reservoir 14001 may be connected with other components of the embodiment, such as baffles 14002, during assembly of the water treatment system in the field.

In preferred embodiments of the invention, a separate reservoir 14001 may have pre-fabricated accommodations for the components, such as slots, hooks, eyelets, sleeves, toggles or other connection points through which components can be connected with reservoir 14001. In other embodiments the components may be connected through techniques like gluing, riveting, sewing or welding. In some embodiments the components may be supported by a support frame, as disclosed in more detail further below.

Reservoir 14001 is designed as an anaerobic digester, and as such its contents need to be protected from oxygen in the atmosphere. As illustrated in FIG. 14A, the walls of reservoir 14001 may be sealed against access hatch 14005, which can be capped to isolate the reservoir from the environment.

As will be disclosed in more detail below, in some preferred embodiments of the invention reservoir 14001 may be integrated with one or more other components of the water treatment system, such baffles 14002, into a reservoir assembly, wherein the reservoir assembly 14000 is expandable from a collapsed configuration having a first volume to an expanded configuration having a second volume. Integration of other components of the system with reservoir 14001 may facilitate and speed up erection of the system in the field.

In some embodiments of the invention reservoir 14001 or reservoir assembly 14000 may be supported by a support frame to maintain an expanded configuration, as will be disclosed in more detail below. For instance, reservoir 14001 illustrated in FIGS. 14A and 14B, having a flexible sheet construction, is illustrated being supported by support frame 14009. Other reservoirs according to the invention, for instance those with a telescoping construction made of at least somewhat rigid materials, may be self-supporting once the segments of the telescoping construction have been locked in place, for instance by threaded fasteners, rivets, welding, gluing or snap-fit locking systems.

Some embodiments of the invention comprise at least one baffle. Some preferred embodiments comprise at least two baffles.

Functions of baffles 14002 include guiding solids to settle at the lower levels of the reservoir, and directing and concentrating methane gas at outlet 14006. In some embodiments baffles 14002 may act as structural members supporting reservoir 14001.

In some embodiments baffles 14002 may be present as planar devices inside reservoir 14001. In some embodiments one baffles 14002 may be present, in other embodiments more than one baffle 14002 may be present.

In some embodiments a methane gas collector in the form of an inverted funnel may replace one or more baffles, and, guide methane gas to a gas outlet In some embodiments the baffles may be combined with other components of the embodiment, like parts of a support frame, into a baffle assemblies.

In some embodiments baffles 14002 may be integrated with reservoir assembly 14000. For instance, a reservoir 14001 in the form of a foldable, pliable sheet as in FIG. 14A may be integrated with baffles 14002 having a pliable sheet design as in FIGS. 4A and 5A, forming an integrated, foldable assembly.

In some embodiments, a reservoir 14001 with a fixed diameter, as in FIGS. 14A and 14B may be integrated with solid disk baffles 14002.

In some embodiments baffles 14002 may be separate entities. The baffles 14002 may be of a variety of configurations, including a pliable sheet design (FIGS. 4A and 5A), a foldable accordion design (FIGS. 4B and 5B), a set of slidably connected segments, expandable to a full disc (FIGS. 4C and 5C), a foldable, umbrella-type design (FIGS. 4D and 5D), and a solid disk (FIGS. 4E and 5E). The shape of baffles 14002 may be any shape required to match the other components of the device, including circular, oval, square rectangular, triangular or custom-designed cross sections. Since baffles 14002 are typically mounted under a slanted angle inside reservoir 14001, the cross sectional profile of baffles 14002 may not be identical to that of reservoir 14001. For instance, in some embodiments a slightly oval cross section of a baffle 14002 may be preferred for a round cross section of reservoir 14001.

Functions of water inlet 14003 include introducing water to reservoir 14001. Water inlet 14003 may be connected with a supply of water to be treated by any standard means of connecting piped water systems, including threaded ends, flanges snap-fittings and the like. Optionally, a valved connection system may be used. In some embodiments water inlet 14003 may be connected with other compartments of a water treatment system, like a sedimentation chamber.

Water inlet 14003 may advantageously be placed at the level below the anaerobic sludge blanket 14008 present in reservoir 14001 during operation of the system to allow for efficient introduction of wastewater into sludge blanket 14008. Multiple water inlets may be present under the scope of the invention Functions of water outlet 14004 include draining water from reservoir 14001.

Water outlet 14004 may advantageously be placed at an upper level of reservoir assembly 14000, to allow sediment to settle at lower levels, to facilitate gas removal and to allow for treated water to be removed though water outlet 14004. Water outlet 14004 may be of any type of desired design, including standard commercially available valves or specifically designed conduits for recirculating the treated water into the equipment. Multiple water outlets may be present under the scope of the invention Some embodiments may comprise a gas outlet 14006. Functions of gas outlet 14006 include providing an outlet mechanism for methane gas produced in the treatment process, and, if desired, connecting it to a system for gas collection and use as an energy source.

Gas outlet 14006 may advantageously be placed close to the upper level of the highest one of baffles 14002 to efficiently capture produced methane gas. Gas outlet 14006 may be of any type of desired design, including standard commercially available gas valves. Multiple gas outlets may be present under the scope of the invention.

Some embodiments may comprise a sludge outlet 14007. Functions of sludge outlet 14007 may include removal of sludge sediment from the reservoir 14001. Sludge outlet 14007 may be configured to route sediment to other equipment within a treatment plant, to be collected manually, or any other suitable means of sediment capture and processing.

Some embodiments may one or more access hatches 14005. Access hatch 14005 may be advantageous to inspect the interior of the digester to allow for periodic cleaning, to observe that all visible components are working properly and to check the quality of water leaving the digester.

Some embodiments of the invention comprise support frames or components for the construction of support frames configured to support reservoirs or reservoir assemblies. Support frames for Upflow Anaerobic Sludge Blanket Reactors can be constructed and utilized in analogous manner as was described for the support frames for Trickle Filter/Clarifier combinations. Those with ordinary skills in the art will easily be able to design and construct such support frames based on the description provided above.

In some embodiments, internal baffles 14002 may be supported by support cross members. In some embodiments, internal baffles 14002 may be integrated with support cross members into a single unit.

Some embodiments of the invention may be configured as recirculating anaerobic digesters (RAD).

Collapsible digesters for water treatment have been developed to facilitate transportation and erection in the field of such plants. (U.S. Pat. No. 7,169,296; Humphrey et al.; Jan. 30, 2007). However, these systems are designed for aerobic digestion and for horizontal water flow. They do not provide the option of repeated anaerobic upflow digestion of partially purified water by the biologically most active compartments of a digester. Additionally, these systems still require separate insertion of filter plates, adding to the number of steps required during set up.

Generally, repeated upflow treatment is considered beneficial, since it forces water to enter a biologically active mass of bacteria at the lower levels of a digester chamber, exposing contaminants to the digestive action of the bacteria, and allowing treated water to rise to the top of the chamber. Directing the treated water to the lower level of a consecutive chamber and repeating the process allows for an efficient repetitive purification process.

Such repetitive processes have been carried out in rigid chambers, like steel or concrete or fiberglass tanks, but not in easily collapsible and expandable chambers that would facilitate transportation and set-up in the field.

The invention disclosed here addresses the need for an efficient, repeating or recirculating anaerobic digestion system that is easily transportable and efficient to erect in the field.

As illustrated in FIGS. 15A and 15B, some embodiments of the invention may be configured as Recirculating Anaerobic Digesters (RAD) systems.

FIG. 15A illustrates a cross sectional view of an exemplary embodiment of a Recirculating Anaerobic Digester system according to the invention in an expanded configuration.

The embodiment comprises an assembly of three digester reservoirs 15001, 15002, and 15003, each configured as an individual anaerobic digester reservoir. While FIG. 15A illustrates an embodiment with three digester reservoirs, it should be understood that the minimum number of digester reservoirs under the scope of the invention for a recirculating anaerobic digester is two. The total number of reservoirs may be determined by a designer of the water treatment system based such considerations as the volume and flow rate and contamination levels of the water to be treated. Some preferred embodiments may comprise from 2 to 5 reservoirs, but higher numbers of reservoirs are included under the scope of the invention.

Also shown is an optional sedimentation tank 15011. Sedimentation tank 15011 may be included in the array of reservoirs, essentially as an additional reservoir, or may be a separately located unit.

The embodiment shown illustrates a configuration in which the reservoirs in an in-line position, but the invention is not so limited. Other embodiments include, but are not limited to, a set of concentric reservoirs, and a set of reservoirs arranged in a polygonal arrangement, such as four reservoirs arranged in a square.

Reservoirs 15001, 15002 and 15003 are shown equipped with conduits 15004 guiding water to a level below an active biological mass 15010 at the lower level of reservoirs 15001, 15002 and 15003, and providing a pathway for water from water inlet 15005 to water outlet 15006. Water inlet 15005 is connected with reservoir 15001 and water outlet 15006 is connected with reservoir 15003. Sludge outlets 15007 are located at the bottom of reservoirs 15001, 15002 and 15003 and tank 15011.

The embodiment further comprises support frame 15008, access hatches 15009 and internal baffles 15012

During operation of some embodiments of the invention, an active biological mass 15010 is present at the lower levels of the reservoirs 15001, 15002 and 15003 and a flow of water is maintained from water inlet 15005 to water outlet 15006. Water is introduced at water inlet 15005, and in preferred embodiments guided into the active biological mass of microbes digests contaminants in the water by conduit 15004. The treated water is allowed to rise to the level of the next water inlet of the next conduit 15004 located at an upper level of reservoir 15001, through which the water is directed to a lower level of reservoir 15002, and the process is repeated. At the end of the entire process, water is allowed to exit at reservoir 15003, through water outlet 15006, in preferred embodiments located at an upper level of reservoir 15003. Internal baffles 15012 assist in guiding the water into conduits 15004 in a controlled manner For the purpose of this disclosure, lower level shall mean any level below half the height of a reservoir, in most preferred embodiments below a level of 25% of the height of the reservoir. Upper level shall mean any level above half the height of a reservoir. In most preferred embodiments above 75% of the height of the reservoir.

The exemplary embodiment in FIG. 15A has been expanded from a collapsed configuration in FIG. 15B to an expanded configuration shown in FIG. 15A.

Embodiments of the invention may comprise expandable reservoirs 15001, 15002 and 15003 having a collapsed configuration with a first volume and an expanded configuration with a second volume. In some preferred embodiments of the invention the second volume is at least four times larger than the first volume.

Functions of reservoirs 15001, 15002 and 15003 may include accommodating the flow of water subject to treatment and holding a biologically active mass of bacteria.

Reservoirs 15001, 15002 and 15003 in FIGS. 15A and 15B are of a flexible, pliable sheet construction, and have been expanded from a collapsed configuration in FIG. 15B to an expanded configuration in FIG. 15A.

Reservoirs 15001, 15002 and 15003 may have a variety of constructions, including, but not limited to, a flexible or pliable sheet construction, (FIG. 3A), an accordion construction (FIG. 3B), and a telescope construction (FIG. 3C). Flexible sheet constructions may be folded, as in FIG. 3A or rolled, as in FIG. 3D, in the collapsed configuration of the reservoir.

Suitable materials of construction for reservoirs 15001, 15002 and 15003 may include polymeric components like poly-ethylene, polypropylene, nylons, poly-carbonates and poly-urethanes and poly-ethylene terephthalate. For some embodiments or components of the invention composite materials, like fiber-reinforced polymeric materials, may be suitable. Suitable materials for non-flexible, expandable reservoirs may include metals, like aluminum, stainless steel, copper and galvanized iron.

The embodiments of the invention may have different types of shapes and cross sections, including circular, triangular, square or rectangular cross-sections, or custom cross-sections for specific requirements from a location for the device.

In some embodiments reservoirs 15001, 15002 and 15003 may be separate entities. In such embodiments reservoirs 15001, 15002 and 15003 may be connected with each other through use of a frame. In some embodiments reservoirs 15001, 15002 and 15003 may be integrated into a single expandable unit. Integration may be achieved by fabricating the reservoirs as separate units and connecting the units by well-known means of connecting materials, such as gluing, welding, sewing, riveting and the like. In an alternative manufacturing method, a continuous sheet of flexible material, such as a flexible polymeric material may be used for the front and the rear wall of the reservoirs in an accordion-like configuration, and sidewalls may be attached through connecting means like sewing, gluing or welding.

Reservoirs 15001, 15002 and 15003 are designed as anaerobic digestion reservoirs, and as such their contents need to be protected from oxygen in the atmosphere. As illustrated in FIG. 15A, the walls of reservoirs 15001, 15002 and 15003 may be sealed against access hatches 15009, which can be capped to isolate the reservoirs from the environment.

In some embodiments of the invention reservoirs 15001, 15002 and 15003 may be connected with conduits 15004 in the field. In such embodiments, reservoirs 15001 and 15002 may have pre-fabricated accommodations for the conduits, such as slots, hooks, eyelets, sleeves, toggles or other connection points through which conduits 15004 can be connected with reservoirs 15001 and 15002. In other embodiments conduit 15004 may be connected through techniques like gluing, riveting, sewing or welding.

In some embodiments reservoirs 15001, 15002 and 15003 may be integrated with conduits 15004 into a single integrated expandable unit. In some embodiments the integrated conduits 15004 may be tubular structures integrated with reservoirs 15001, 15002 and 15003.

As illustrated in FIG. 15C, in some embodiments, for instance in embodiments manufactured out of sheets of fabric or other pliable material, two reservoirs 15020 and 15021 may be adjacent to each other at wall 15022 on reservoir 15020 and wall 15023 on reservoir 15021. By connecting walls 15022 and 15023 in a configuration that leaves one or more channels or lumens open between walls 15022 and 15023, the channels or lumens can be used to create conduits between reservoirs 15020 and 15021. For instance, conduits 15024 may be created by employing a number of seams 15025 connecting wall 15022 and wall 15023, setting seams 15025 a certain desired distance apart and using the space between the seams as conduits 15024.

Water in reservoir 15022 can flow according to arrows 15027 from upper level 15029 to a lower level 15030 in reservoir 15021 according to arrows 15028.

Seams 16006 may be formed by directly joining the material of the reservoirs, or may be formed indirectly, for instance by connecting the reservoirs through a baffle. The seams may be created by commonly known joining techniques like stitching, welding, gluing or other suitable methods.

In some embodiments of the invention reservoirs 15001, 15002 and 15003 may be supported by a support frame to maintain an expanded configuration. For instance, reservoirs 15001, 15002 and 15003 illustrated in FIG. 15A, having a flexible sheet construction, are illustrated being supported by support frame 15008. Other reservoirs according to the invention, for instance those with a telescoping construction made of at least somewhat rigid materials, may be self-supporting once the segments of the telescoping construction have been locked in place, for instance by threaded fasteners, rivets, welding, gluing or snap-fit locking systems.

Optionally, in some preferred embodiments an additional sedimentation tank 15011 may be present. Sedimentation tank 15011 may be of a similar expandable construction as digester reservoirs 15001, 15002 and 15003. Sedimentation tank 15011 may comprise water inlet 15013 and outlet 15014, wherein water outlet 15014 is connected with water inlet 15005 of reservoir 15001. Both water inlet 15013 and water outlet 15014 are shown located at an upper level in sedimentation tank 15011, with an internal baffle 15012 guiding the incoming water. Sedimentation tank 15011 may further comprise a sediment outlet 15015.

Functions of sedimentation tank 15011 include providing a reservoir of relatively undisturbed water to allow solid particulate matter to settle towards the bottom of the tank.

In some embodiments, sedimentation tank 15011 may be integrated with digester reservoirs 15001, 15002 and 15003 into a single unit.

In self-controlled reservoir sequences, as disclosed below, the height of water inlet 15013 is chosen such that the water level in sedimentation tank 15011 can rise above level A indicated by arrow 15016, and the flow rate of water through the system can be controlled by the input rate of water through water inlet 15013.

Some embodiments of the invention may comprise conduits 15004. Functions of conduits 15004 may include connecting sedimentation tank 15011 and reservoirs 15001, 15002 and 15003, providing a continuous path for a water flow from water inlet 15005 to water outlet 15006, or from water inlet 15013 to water outlet 15006, and guiding water entering reservoirs 15001, 15002 and 15003 to a level below the surface of the active biological mass 15010 present in reservoirs 15001, 15002 and 15003 during operation of the system. More than 1 conduit 15004 may be present between 2 reservoirs.

In some embodiments of the invention, as shown in FIG. 15A, conduits 15004 act as overflow systems. If the water level in reservoir 15001 rises above level A indicated by the arrow 15016, water will flow into reservoir 15002, until the water level in reservoir 15001 drops back below level A. These steps may be repeated by conduit 15004 between reservoir 15002 and 15003. In such embodiments, water levels in reservoirs 15001 and 15002 are self-regulated by the system. Finally, when water reaches the level of water outlet 15006, water is automatically discharged from reservoir 15003. Therefore, in such embodiments the flow of water through the system is entirely gravity driven, self-controlled within the system, and ultimately controlled by the input rate of water at water inlet 15005 or water inlet 15013.

Conduits 15004, as shown in FIGS. 15A and 15B are of a flexible construction, but other constructions are possible under the scope of the invention. For instance, conduits 15004 may be of a rigid tubular construction.

Suitable materials of construction for conduits 15004 may include polymeric components like poly-ethylene, polypropylene, nylons, poly-carbonates and poly-urethanes and poly-ethylene terephthalate. For some embodiments or components of the invention composite materials, like fiber-reinforced polymeric materials, may be suitable. Suitable materials for non-flexible conduits may include metals, like stainless steel, copper and galvanized iron.

The water inlet end of conduits 15004 may advantageously be placed at the upper levels of reservoirs 15002 and 15003 to allow a biologically active blanket of microbes to form in the liquid at the lower level of reservoirs 15001, 15002 and 15003, and to allow sediment to settle at lower levels of the reservoirs.

The water outlet end of conduits 15004 may advantageously be placed below the surface of the biologically active blanket of microbes in the reservoirs, to allow influent to flow up through the suspended biological blanket for treatment, and to allow treated water to be removed through conduits 15004 and water outlet 15006.

In some embodiments, conduits 15004 may be separate entities and may be connected with reservoirs 15001 and 15002 in the field. In such embodiments, conduits 15004 may have pre-fabricated accommodations for the reservoirs, such as slots, hooks, eyelets, sleeves, toggles or other connection points through which conduits 15004 can be connected with reservoirs 15001 and 15002. In other embodiments conduit 15004 may be connected through techniques like gluing, riveting, sewing or welding.

In some embodiments, conduits 15004 may be integrated with reservoirs 15001, 15002 and 15003. For instance, flexible conduits 15004 may be integrated with a set of flexible reservoirs 15001, 15002 and 15003 that have been integrated into a single unit, to form a single, flexible, expandable assembly of reservoirs and conduits. As was mentioned above, in some embodiments conduits 15004 may not be individual units or structures, but may be formed by a spatial arrangements of seams or welds connecting two reservoirs, or tank 15011 and reservoir 15001, whereby the space between the seams or welds operatively functions as a conduit 15004.

In some embodiments, tank 15011 and reservoirs 15001, 15002 and 15003 with a flexible construction may be collapsed by rolling the reservoir fabric around rigid tubular conduits 15004.

Functions of water inlet 15005 include introducing water to reservoir 15001. Water inlet 15005 may be connected with a supply of water to be treated by any standard means of connecting piped water systems, including threaded ends, flanges snap-fittings and the like. Optionally, a valved connection system may be used. In some embodiments water inlet 15005 may be connected with a water outlet 15014 of a sedimentation tank 15011.

Water inlet 15005 may be located at any level of reservoir 15001.

In some embodiments water inlet 15005 may be located below the surface of the biologically active blanket of microbes, to allow influent to flow up through the suspended biological blanket for treatment, and to allow treated water to be removed through conduits 15004. In such embodiments enough pressure should be applied to the water supply to allow water to rise to level A.

In some embodiments of the invention water inlet 15005 may be located near the top of first reservoir 15001, at a level above level A, to allow for an entirely gravity driven flow of water. In such embodiments a conduit 15004 may advantageously be used to guide the water to a level below the surface of the active biological mass 15010.

In some embodiments, as illustrated in FIG. 15A, water inlet 15005 may be placed at a level where it can be connected with water outlet 15014 of sedimentation tank 15011 and the location of water outlet maybe at an intermediate level, as shown in FIG. 15A.

In such embodiments the flow of water through the system may be controlled by controlling the flow of water through water inlet 15013 in tank 15011.

Functions of water outlet 15006 include draining water from reservoir 15003.

Water outlet 15006 may advantageously be placed at an upper level of reservoir assembly 15003, to allow a biologically active blanket of microbes to form in the liquid at the lower level of reservoir 15003, and to allow sediment to settle at lower levels of the reservoirs 15003.

Water outlet 15006 may be connected with a system for receiving treated water, such as further treatment systems or the environment, by any standard means of connecting piped water systems, including threaded ends, flanges snap-fittings and the like. Optionally, a valved connection system may be used.

Functions of sludge outlet 15007 include allowing accumulated sludge/bio-solids to be removed periodically from the reservoirs 15001, 15002 and 15003 to optimize the performance of the digester. Sludge outlets 15007 are advantageously located at or near the bottom of reservoirs 15001, 15002 and 15003.

Some embodiments may one or more access hatches 15009. Access hatch 15009 may be advantageous to inspect the interior of the digester to allow for periodic cleaning, to observe that all visible components are working properly and to check the quality of water leaving the digester.

Some embodiments may comprise a gas outlet. (Not shown) Functions of a gas outlet include providing an outlet mechanism for methane gas produced in the treatment process, and, if desired, connecting it to a system for gas collection and use as an energy source.

Gas outlets may advantageously be placed close to the upper level of reservoirs 15001, 15002 and 15003 to efficiently capture produced methane gas. Gas outlets may be of any type of desired design, including standard commercially available gas valves. Multiple gas outlets may be present under the scope of the invention Some embodiments may comprise internal baffles 15012. Functions of internal baffles 15012 may include guiding water to desired levels within tank 15011 and reservoirs 15001, 15002 and 15003, and preventing undesired turbulence caused by flowing water. Similar to the construction of conduits 15004, internal baffles 15012 may be separate units, to be connected to the system in the field, or, in some embodiments, may be integrated with tank 15011 and reservoirs 15001, 15002 and 15003 into single units to facilitate set-up in the field.

Some embodiments of the invention comprise support frames or components for the construction of support frames configured to support reservoirs or reservoir assemblies. Support frames for recirculating anaerobic digesters can be constructed and utilized in analogous manner as was described for the support frames for Trickle Filter/Clarifier combinations. Those with ordinary skills in the art will easily be able to design and construct such support frames based on the description provided above.

Some embodiments of the invention comprise components of a water treatment system that are adjustable to a range of shapes and sizes of reservoirs used in the construction of the water treatment system. Size adjustable components include, for instance, inserts useful as a separator assembly or a floor assembly for a trickle filter-clarifier combination, or as baffles for an upflow anaerobic sludge blanket reactor. Other components may include a size-adjustable internal support frame.

In the embodiment shown in an expanded configuration in FIG. 16A and in a collapsed configuration in FIG. 16B, an internal frame may be used for a trickle filter clarifier combination. The frame comprises a central support 16001 with sections 16002, 16003 and 16004. The central support is hingedly attached to support cross members 16005 with telescoping members 16006, 16007 and 16008, and support cross member 16009 with telescoping members 16010, 16011 and 16012. In this case, support cross members 16005 may be used to support a separator assembly, and support cross members 16009 may be used to support a floor assembly. Additionally, section 16004 may be used as an internal drain, allowing water to enter the drain at water inlets 16014 at the bottom of a biological medium compartment, and allowing water to exit the drain at water outlets 16015 proximate the bottom of a clarifier compartment.

A detailed illustration of an exemplary embodiment of a support cross member assembly is shown in FIG. 17. Support cross members 17000 are shown comprising telescoping sections 17001 and 17002. Sections 17002 are connected with a central hub 17003, which is connected with a section of an upright central support member 17004.

The support cross member assembly can be used in either position, with support cross members 17000 either folding upward or downward.

An alternative embodiment of the invention is illustrated in FIGS. 18A and 18B. Support cross members 18002 and 18003 are hingedly attached to central support member 18001 at pivot points 18004 and 18005. Pivoting support cross members 18002 and 18003 around pivot points 18004 and 18005 allows support cross members 18002 and 18003 to move between an extended configuration shown in FIG. 18A and a collapsed configuration shown in FIG. 18B. Further collapse of the frame may be achieved if the sections of support cross members were to be made in a telescoping fashion.

The number of support cross members may be determined by a variety of considerations, including, for instance, the design of the water treatment reservoir, design of a separator assembly or floor assembly, presence of other structural components, cost, etc.

In some embodiments, no umbrella-like support cross members may be necessary at all, for instance when self-supporting inserts, like separator assemblies and floor assemblies are used, as will be discussed below.

A single support cross member 18002 may be used on conjunction with a insert and a perimeter support ring 20004, as shown in FIG. 20B.

Central support member 18001 may me used to support other components of the water treatment system, like the spray nozzle 2010 in FIGS. 2A and 2B.

Those of ordinary skills in the art will be able to construe many other embodiments, falling under the scope of the invention. For instance, hingedly collapsible rather than telescoping central support members and support cross members may be used. Alternatively, the sections of central support members and the support cross members may comprise individual lengths of tubing with threaded ends that can be assembled into full support cross members.

The internal support frame can be made of any material with sufficient mechanical strength and corrosion resistance, for instance metals like stainless steel or copper or polymeric materials, like poly-ethylene, poly-propylene, nylon, poly-ethylene terephthalate etc.

In some embodiments of the invention the support cross members may be combined into assemblies that do not require a central support member. Such assemblies may be attached to the internal wall of a reservoir used in he construction of a water treatment system.

As illustrated in FIG. 19, in such embodiments support cross members 19001, comprising sections 19002, 19003 and 19004 may be hingedly connected to a central hub 19005, and be moveable between an extended and a collapsed configuration.

The outermost sections 19002 may comprise an attachment feature 19006 to attach the support cross member to the wall of a reservoir.

Some embodiments of the invention may comprise an insert serving as a separator assembly being adjustable to a range of diameters of reservoirs used in the construction of a water treatment system.

Some embodiments of the invention may comprise an insert serving as floor assembly being adjustable to a range of diameters of reservoirs used in the construction of a water treatment system.

Some embodiments of the invention may comprise an insert serving as a baffle assembly being adjustable to a range of diameters of reservoirs used in the construction of a water treatment system.

An exemplary embodiment of a size adjustable insert is illustrated in FIG. 20A-20C. A central hub 20001 is attached to 4 support cross members 20002. Support cross members 20002 are of a length-adjustable telescoping design. An elastic sheet of material 20003 is attached to the support cross members 20002, and can be expanded to a larger surface area by extending telescoping support cross members 20002. In this configuration a variety of polygonal shapes for insert can be accomplished by changing the number of support cross members 20002 and adjusting the length of support cross members 20002.

An insert with a circular or otherwise curved cross section may be achieved by additionally using a perimeter support ring as illustrated in FIG. 20B. The diameter of a hollow perimeter support ring 20004 can be adjusted by adjusting the depth of insertion of inserted end 20005 into the insertion end 20006.

As shown in FIG. 20C, perimeter support ring 20004 can be adjusted to a desirable circumference, and then attached to support cross members 20002 in FIG. 20A. Support ring 20004 is preferably constructed from at least somewhat elastic material, in order to accommodate the different curvatures of the ring associated with different diameters.

The insertion cross section of ring 20004 can be any desired shape, like circular, square, triangular etc.

Similar to the embodiment of FIG. 20A, an elastic sheet of material can be used to cover the assembly of FIG. 20C to form an insert.

Suitable materials of construction fort the elastic sheets of material of the embodiments include elastomeric polymers, such as many poly-urethanes and silicones, rubbers and polybutadiene.

Some embodiments of the invention may comprise a sheet of material having a size corresponding to the maximum cross section of a water treatment system, as defined by full extension of the support cross members.

As shown in FIGS. 21A and B, a sheet 21001 may have a number of sleeves 21002 corresponding to a number of support cross bars. As shown in FIG. 21B, sheet 21001 can be mounted on a set of support cross bars 21003 by sliding sleeves 21002 over support cross bars 21003. Support 21003 cross bars can be extended to their desired length, and any excess length 21004 of the sheet 21001 can either be cut to size or simply be folded into one of the adjacent compartments, like a clarifier—or biological medium compartment.

Analogous to the embodiments illustrated in FIG. 20A-20C, an adjustable perimeter support ring may be added to the embodiments of FIG. 21A-21B.

In some embodiments of the invention slidably size-adjustable inserts may be used.

An exemplary embodiment of a size-adjustable circular insert is illustrated in FIG. 22A-22C.

A number of lamellae 22001 are hingedly attached to a base plate 22002 at pivot points 22003. The convex outer aspects 22004 of lamellae 22001 cooperatively define a size-adjustable outer perimeter 22005, when lamellae 22001 are pivoted in concert around their respective pivot points 22003. Lamellae 22001 are shown in an extended configuration in FIG. 22A and in a collapsed configuration in FIG. 22B. Base plate 22002 is sized to cover any gaps between the bases of lamellae 22001 near pivot points 22003.

As illustrated in FIG. 22C, an adjustable outer perimeter annular ring 22007, similar to the adjustable outer perimeter ring 20004 in FIG. 20B can be used to support the convex outer aspects 22004 of the lamellae 22001, and, if necessary, so cover any gaps between lamellae 22001 along their outer perimeter 22005. As shown in FIG. 22C, in this case ring 22007 has a rectangular cross section at insertion end 22008, into which inserted end 22009 of disc 22007 can be inserted to a desired depth.

Lamellae 22001 can be secured in their desired position by several means, for instance by using a threaded end on the pivot points, and securing the lamellae with a bolt on the threaded end. Also, when using perimeter annular disc 22007, lamellae 22001 may be bolted to disc 22007.

Other means of securing the lamellae 22001 may be used as well, for instance by using an adhesive or by drilling holes and using nuts and bolts.

Sealing between the lamellae to prevent leakage may be improved by incorporating sealing components in the construction, like rubberized coatings or elastomeric seals.

Polygonal inserts may be slidably adjustable as well.

An exemplary embodiment of a square insert is illustrated in FIGS. 23A and 23B.

As shown in FIG. 23A, 4 moveable rectangular sheets 23002 are arranged in a tessellated fashion around a base plate 23001. FIG. 23A illustrates the assembly in an expanded configuration. By moving sheets 23002 towards the center of the insert, a collapsed configuration, as shown in FIG. 23B can be achieved. Sheets 23002 may be secured in a desired position by using threaded ends, sliding in tracks and secured by bolts, for instance threaded ends 23003 on sheets 23002, sliding in a tracks 23004 on the base plate 23001.

Other means of securing sheets 23002 may be used as well, for instance by using an adhesive, or by drilling holes and using nuts and bolts.

Sealing between the sheets to prevent leakage may be improved by incorporating sealing components in the construction, like rubberized coatings or elastomeric seals.

Embodiments of the invention further encompass methods to erect water treatment systems in the field.

Methods of the invention generally comprise providing water treatment systems in a collapsed configuration and expanding the water treatment systems in the field. Water treatment systems provided according to the invention may comprise a reservoir. In preferred embodiments of the invention the reservoir is integrated with other components of the water treatment system into a reservoir assembly, enabling simultaneous expansion of multiple components in a single step, thus facilitating erection of the water treatment system in the field.

Some methods of the invention additionally may include providing an expandable frame or components for a frame for a water treatment system.

Some methods according to the invention further may include the steps of expanding or assembling the frame, and connecting the frame with the reservoir or reservoir assembly.

Some methods of the invention may include providing an expandable frame, connected with an expandable reservoir or reservoir assembly, and erecting a water treatment system in the field by a expanding the frame and the reservoir assembly in a concerted manner.

Methods to erect a frame may include assembling a frame from individual components, and expanding a pre-assembled frame from a collapsed configuration into an expanded configuration.

In some embodiments, assembling a frame may include connecting frame components through the use of connector hubs, threaded ends, snap-lock systems, use of nuts and bolts and other methods commonly known by those with ordinary skills in the art.

In some embodiments, expanding pre-assembled frames may be accomplished by moving hingedly or telescopingly connected frame members with respect to each other.

In some embodiments expanding a hinging frame may comprise using a threaded actuator like in a scissor jack, as illustrated in FIGS. 10A and 10B.

In some embodiments expanding a telescoping frame may comprise using a hydraulic system (Not shown).

After expansion of the reservoir the individual moving members may be locked in place using commonly available fasteners like threaded fasteners, snap-lock systems, clevis pins, and the like.

In some embodiments, connecting a reservoir assembly with a frame may be achieved by using sleeves, toggles, hooks, loops, clips and the like.

In some preferred embodiments erecting a reservoir within a previously erected frame may comprise using a bolt-rope construction.

In some preferred embodiments an expandable frame and an expandable reservoir may be expanded in concert by using an expandable reservoir assembly that has been pre-connected with an expandable frame. Expanding the frame, for instance a hinging type frame, by using a threaded actuator an entire reservoir assembly-frame combination may be erected in a single step.

The embodiments described above are strictly exemplary embodiments. They are included for the sole purpose of illustrating the invention with examples, and are not to be interpreted as limitations on the entire scope of the invention as described in this disclosure.

The invention claimed is:

1. A water treatment system configured as a vertically stacked trickle filter-clarifier combination having a reservoir assembly, the reservoir assembly comprising:
    a reservoir with an upper trickle filter compartment and a lower clarifier compartment, the reservoir having a collapsed configuration with a first volume and an expanded configuration with a second volume, wherein the second volume is at least 4 times larger than the first volume;
    a separator located between the upper trickle filter compartment and the lower clarifier compartment;
    a drain configured as a conduit between the upper trickle filter compartment and the lower clarifier compartment;
    a biological medium carrier within the upper trickle filter compartment, wherein the biological medium carrier has a collapsed configuration with a first volume and an expanded configuration with a second volume;
    a support frame configured to support the reservoir assembly, the support frame having a collapsed configuration and an expanded configuration and having an upright central support member with at least one set of radial support cross members moveably connected with the upright central support member in an umbrella configuration;
    the biological medium carrier being connected with radial support cross members; and
    wherein the radial support cross members are length-adjustable.

2. A water treatment system as in claim 1, further comprising a floor located below the lower clarifier compartment.

3. A water treatment system as in claim 1, wherein at least one of the separator, the drain and the floor is integrated with the reservoir into a single unit.

4. A water treatment system as in claim 1, wherein the biological medium carrier is integrated into a single unit with the upper trickle filter compartment.

5. A water treatment system as in claim 1, wherein the reservoir assembly comprises a flexible sheet construction.

6. A water treatment system as in claim 1, wherein the reservoir assembly comprises an accordion construction.

7. A water treatment system as in claim 1, wherein the reservoir assembly comprises a telescope construction.

* * * * *